United States Patent
Thomas et al.

(10) Patent No.: US 12,354,796 B2
(45) Date of Patent: Jul. 8, 2025

(54) DUAL FUNCTION ENERGY-STORING SUPERCAPACITOR-BASED CARBON FIBER COMPOSITE FOR BODY PANELS OF A VEHICLE

(71) Applicant: University of Central Florida Research Foundation, Inc., Orlando, FL (US)

(72) Inventors: Jayan Thomas, Orlando, FL (US); Deepak Pandey, Orlando, FL (US); Kowsik Sambath Kumar, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 608 days.

(21) Appl. No.: 17/842,145

(22) Filed: Jun. 16, 2022

(65) Prior Publication Data
US 2023/0067318 A1    Mar. 2, 2023

Related U.S. Application Data

(60) Provisional application No. 63/233,476, filed on Aug. 16, 2021.

(51) Int. Cl.
*H01G 11/40* (2013.01)
*B60L 50/40* (2019.01)
(Continued)

(52) U.S. Cl.
CPC .............. *H01G 11/40* (2013.01); *B60L 50/40* (2019.02); *B62D 29/043* (2013.01); *H01G 11/24* (2013.01);
(Continued)

(58) Field of Classification Search
CPC ........ H01G 11/32; H01G 11/70; H01G 11/28; H01G 11/24; H01G 11/40
See application file for complete search history.

(56) References Cited

U.S. PATENT DOCUMENTS

| | | | |
|---|---|---|---|
| 4,865,931 A | 9/1989 | McCullough | |
| 5,518,836 A | 5/1996 | McCullough | |
| (Continued) | | | |

FOREIGN PATENT DOCUMENTS

| | | |
|---|---|---|
| CN | 105470003 A | 4/2016 |
| CN | 105679551 B | 2/2018 |
| WO | 2023/022785 A1 | 2/2023 |

OTHER PUBLICATIONS

James F. Snyder; Structural Composite Capacitors, Supercapacitors, and Batteries for U.S. Army Applications, Proceedings of SMASIS08, ASME Conf on Smart Materials, Adaptive Sturcture and Intelligent Systems, Oct. 2008 (8 pages).
(Continued)

*Primary Examiner* — David M Sinclair
(74) *Attorney, Agent, or Firm* — Fleit Intellectual Property Law; Paul D. Blanco

(57) ABSTRACT

A dual-function supercapacitor carbon fiber composite stores electrical energy and functions, for example, as the body shell of electric vehicles (EVs). This is achieved with a vertically aligned graphene on carbon fiber electrode, upon which metal oxides were deposited to obtain ultra-high energy density anode and cathode. A high-strength multi-layer carbon composite assembly is fabricated using an alternate layer patterning configuration of epoxy and poly-acrylamide gel electrolyte. The energized composite delivers a high areal energy density of 0.31 mWh cm$^{-2}$ at 0.3 mm thickness and showed a high tensile strength of 518 MPa, bending strength of 477 MPa, and impact strength 2666 J/m. To show application in EVs, a toy car body fabricated with
(Continued)

energized composite operates using the energy stored inside the frame. Moreover, when integrated with a solar cell, this composite powered an IoT (internet of things) device, showing feasibility in communication satellites.

16 Claims, 30 Drawing Sheets

(51) Int. Cl.
  B62D 29/04 (2006.01)
  H01G 11/24 (2013.01)
  H01G 11/28 (2013.01)
  H01G 11/70 (2013.01)
(52) U.S. Cl.
  CPC ............. *H01G 11/28* (2013.01); *H01G 11/70* (2013.01); *B60Y 2200/91* (2013.01)

(56) References Cited

U.S. PATENT DOCUMENTS

| | | | |
|---|---|---|---|
| 6,361,900 | B1 | 3/2002 | Parmentier |
| 8,192,863 | B2 | 6/2012 | Best |
| 9,605,193 | B2 | 3/2017 | Yuen et al. |
| 11,686,011 | B2 | 6/2023 | Thomas et al. |
| 2011/0164349 | A1 | 7/2011 | Snyder |
| 2013/0017417 | A1* | 1/2013 | Whitacre ............... H01G 11/50 429/7 |
| 2015/0162140 | A1 | 6/2015 | Hucker |
| 2017/0050533 | A1 | 2/2017 | Wei |
| 2017/0200570 | A1 | 7/2017 | Ciocanel et al. |
| 2018/0040912 | A1 | 2/2018 | Chang |
| 2019/0103235 | A1 | 4/2019 | Hudak |
| 2020/0358079 | A1 | 11/2020 | Hudak |
| 2021/0126243 | A1 | 4/2021 | Lanning et al. |
| 2021/0126246 | A1 | 4/2021 | Gazda et al. |
| 2021/0147999 | A1 | 5/2021 | Thomas |
| 2022/0139639 | A1 | 5/2022 | Thomas |

OTHER PUBLICATIONS

Richard Reece et al., High-Performance Structural Supercapacitor, ACS Appl. Mater. Interfaces, (2020), 12, 25683-25695 (20 pages).
Yuchen Wang, Development of structural supercapacitors with epoxy based adhesive polymer electrolyte; Journal of Energy Storage 26 (2019) 100968 (9 pages).
Yanfang Xu et al, High-Performance Structural Supercapacitors Based on Aligned Discontinuous Carbon Fiber Electrodes and Solid Polymer Electrolytes, ACS Appl. Mater. Interfaces, (2021), 13, 11774-11782 (9 pages).
Andrew S. Westover et al, Multifunctional high strength and high energy epoxy composite structural supercapacitors with wet-dry operational stability, J. Mater.Chem.A, (2015), 3, 20097-20102 (6 pages).
Natasha Shirshova et al, Structural composite supercapacitors, www.elsevier.com/locate/compositesa, Composites: Part A 46 (2013) 96-107 (12 pages).
Nicholas Hudak et al, Structural Supercapacitors with Enhanced Performance Using Carbon, J Electorchemical Society, 164 (4) A691-A700 (2017) (11 pages).
Leif Asp et al, Structural Battery and its Multifunctional Performanc, Advanced Energy & Sustainability Research, (2021) (9 pages).
International Search Report and Written Opinion for PCT/US2022/033881 dated Sep. 2, 2022.

Varma, et al. Fiber-Type Solar Cells, Nanogerators, Batteries, and Suercapacitors for Wearable Applications; Advanced Science 2018, 5, 1800340, 32 pages.
Cherusseri et al., Self-Standing Cardon Nanotube Forest Electodes for Flexible Supercapacitors; RSC Advances 2015, 5, 34335-34341; The Royal Society of Chemistry.
Cherusseri et al., Ultra-flexible Fibrous Supercapacitors with Carbon Nanotube/polypyrrole Brush-like Electrodes, J. Mater. Chem. A. 2016, 4, 9910-9922; The Royal Society of Chemistry.
W. Liu et al., Flexible and Stretchable Energy Storage: Recent Advances and Future Perspectives; Advanced Materials; Advanced Science News 2017, 29, 1603436, 34 pages.
L. Dong et al., Flexible Electrodes and Supercapacitors for Wearable Energy Storage; a review by category Journal of Materials Chemistry A, 2016, 4, p. 4659-4685; The Royal Society of Chemistry.
X. Cai et al., Flexible Planar/Fiber-architectured Supercapacitors for Wearable Energy Storage Journal of Materials Chemistry C, 2014, 2, p. 1184-1200. The Royal Society of Chemistry.
J. Cherusseri et al., Self-Standing Cardon Nanotube Forest Electodes for Flexible Supercapacitors; RSC Advance 2015, 5, p. 34335-34341, The Royal Society of Chemistry.
Z. S. Wu et al., Three-Dimensional Nitrogen and Boron Co-doped Graphene for High-Performance All-Solid-State Supercapacitors; Advanced Materials, 2012, 24, p. 5130-5135.
L. F. Lai et al. Preparation of Supercapacitor Electrodes Through Selection of Graphene Surface Functionalities; vol. 6, No. 7, p. 5941-5951, ACS Nano 2012.
Wu et al., One Step Electrophoretic Deposition of Ni-Decorated Activated-Cardon Film as an Electrode Material for Supercapacitors; Journal of Physical Chemistry C 2010, 114, p. 6190-6196.
C. Du et al., Preparation and Preliminary Property Study of Carbon Nanotubes Films by Electrophoretic Deposition, Material Letters (Elsevier Science) 57, p. 434-438, Dec. 2002.
Tao et al., Fabrication of pH-sensitive Graphene Oxide-drug Superamolecular Hydrogels as Controlled Release Systems; Journal of Materials Chemistry 2012, 22, p. 24856-24861.
Y. He et al.,Capacitive Mechanism of Oxygen Functional Groups on Carbon Surface in Supercapacitors; Electrochimica Acta (Elsevier Science) 282, p. 618-625, 2018.
Cherusseri et al., Hierarchically Mesoporous Cardon Nanpetal Based Electodes for Flexible Supercapacitors with Super-long Cyclic Stability, Journal of Materials Chemistry A 2015, 3, p. 21586-21598. The Royal Society of Chemistry.
P. Sirisinudomkit et al., Hydrid Energy Storage of Battery-type Nickel Hydroxide and Supercapacitor-type Graphene: redox additve and charge storage mechanism; Sustainable Energy & Fuels 2017, 1, p. 275-279; The Royal Society of Chemistry.
Shao et al., Mechanism Analysis of the Capacitance Contributions and Ultralong Cycling-stability of the isomorphous MnO2MnO2 core/shell Nanostructures for Supercapacitors; Journal of Materials Chemistry A 2015, 3, 6168-6176; Royal Society of Chemistry.
Brezesinski, et al., Pseudocapacitive Contributions to Chargw Storage in Highly Ordered Mesoporous Group V Transition Metal Oxides with Iso-Oriented Layed Nanocrystalline Domains, Journal of the American Chemical Society 2010, 132, p. 6982-6990.
Alexandru Vlad et al., Design Considerations for Unconventional Electrochemical Energy Storage Architectures; www.MaterialsViews.com; Advanced Energy Materials 2015, 54 pages.
Shengli Zhai et al., Textile energy storage: Structural design concepts, materials election and future perspectives; Energy Storage Materials 3 (2016) 123-139.
Leif E. Asp et al., A Structural Battery and its Multifunctional Performance, Advanced Energy and Sustainability Research pp. 9 published by Wiley-VCH GmbH, @ 2021.
1 International Preliminary Report on Patentability (IPRP) PCT/US2022/033881 dated Feb. 29, 2024.

* cited by examiner

PC material High energy density High binding
(−) contact
CWCFM / epoxy / CWCFM
PAM gel elec.
CWCFM / epoxy / CWCFM
(+) contact
Vertically aligned Graphene Enhances the SA epoxy
CWCFM

CWCFM

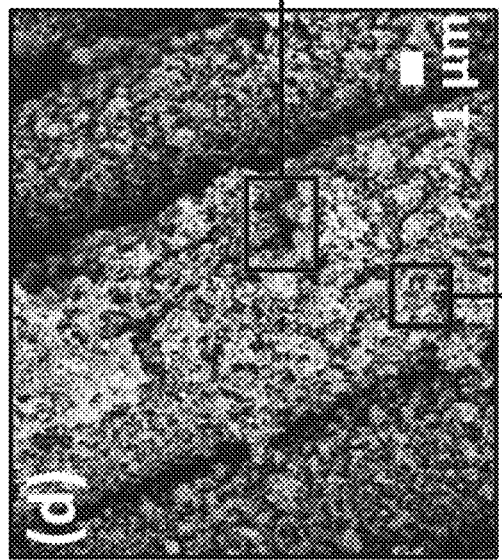
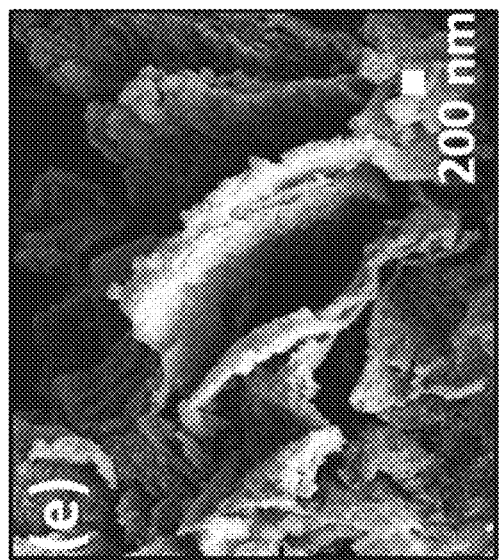
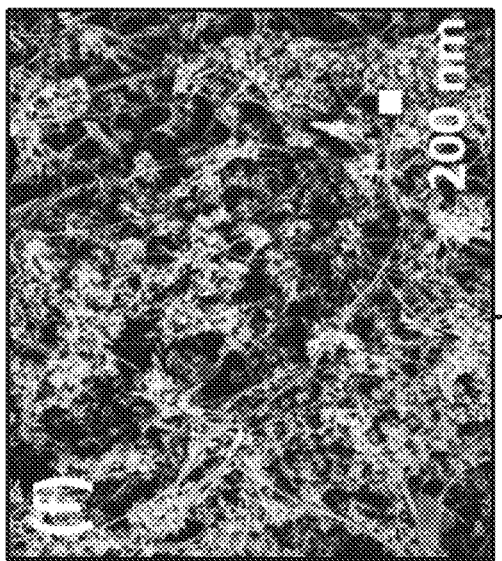
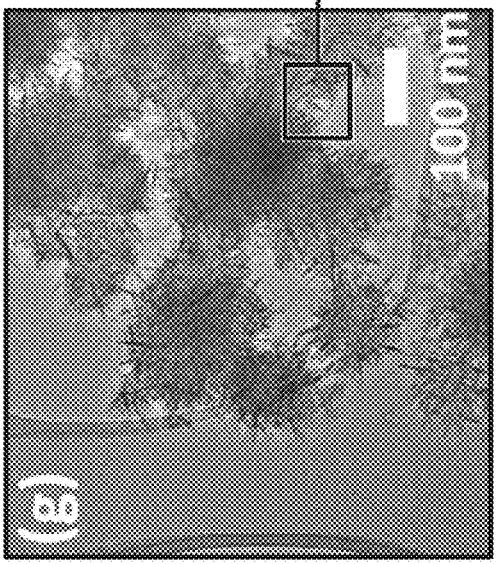
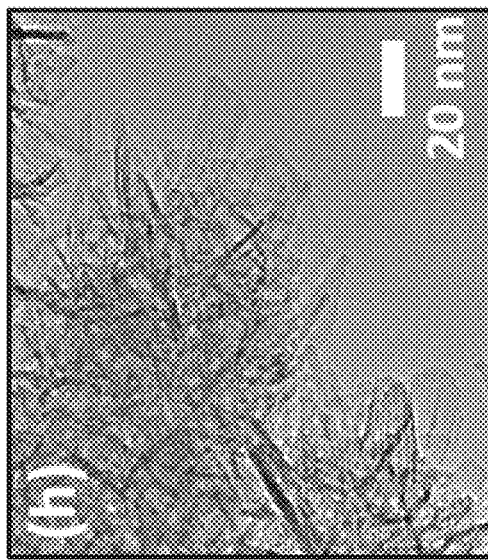
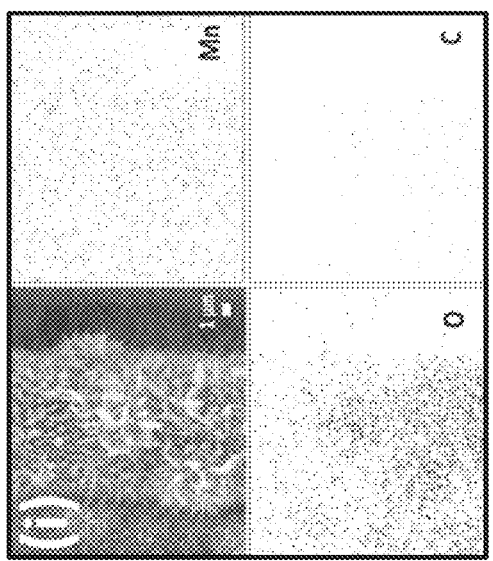
FIG. 3D  FIG. 3E  FIG. 3F
FIG. 3G  FIG. 3H  FIG. 3I

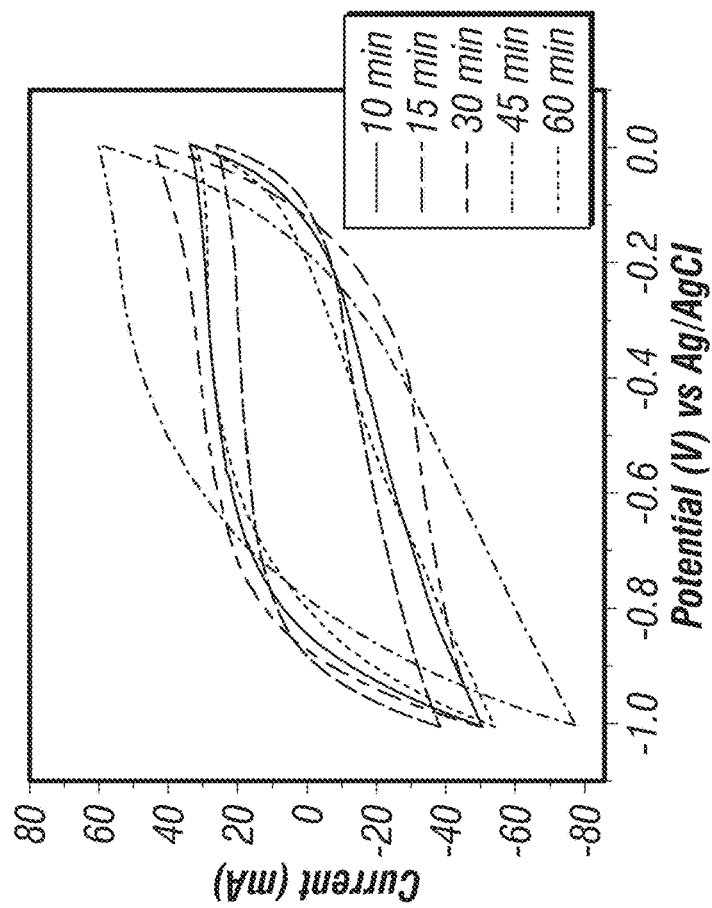
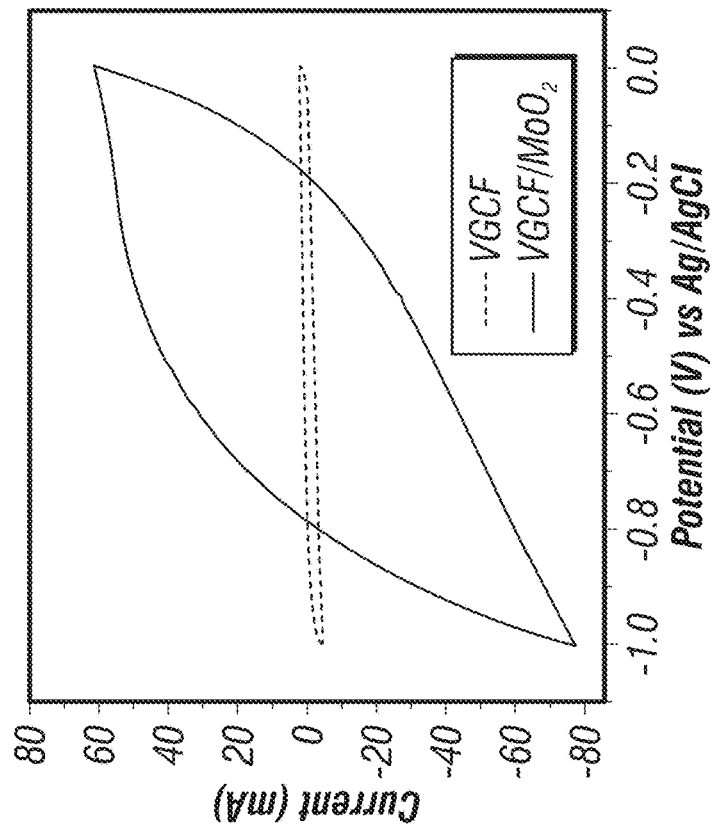
FIG. 5F
FIG. 5E

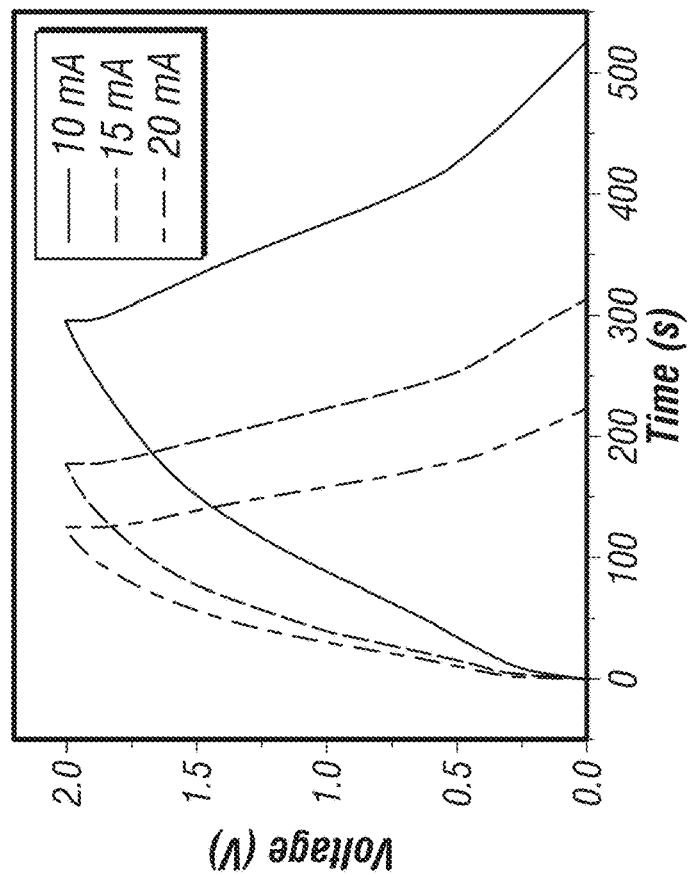
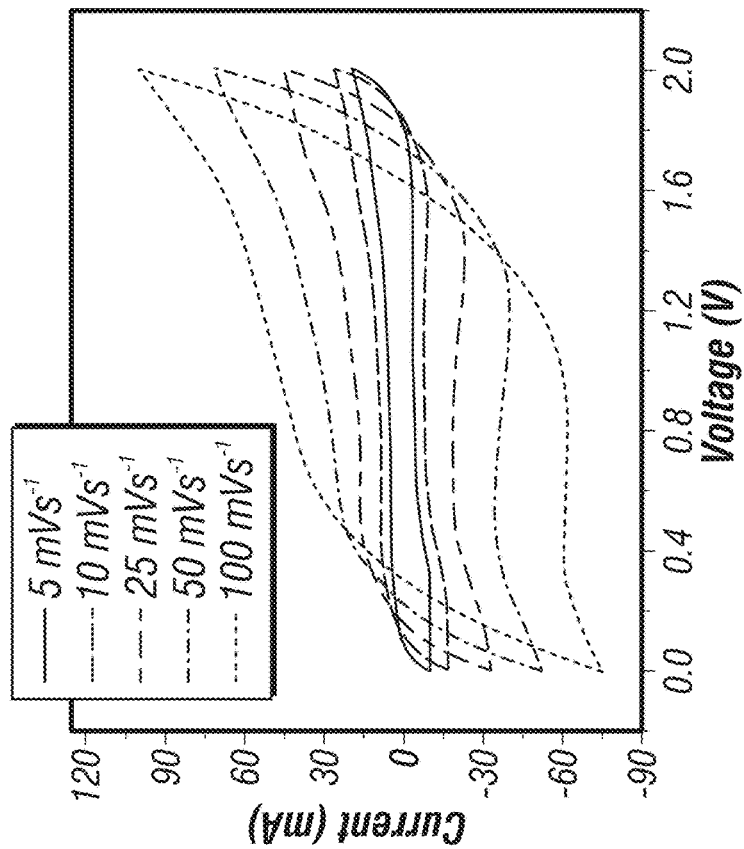
FIG. 8A
FIG. 8B

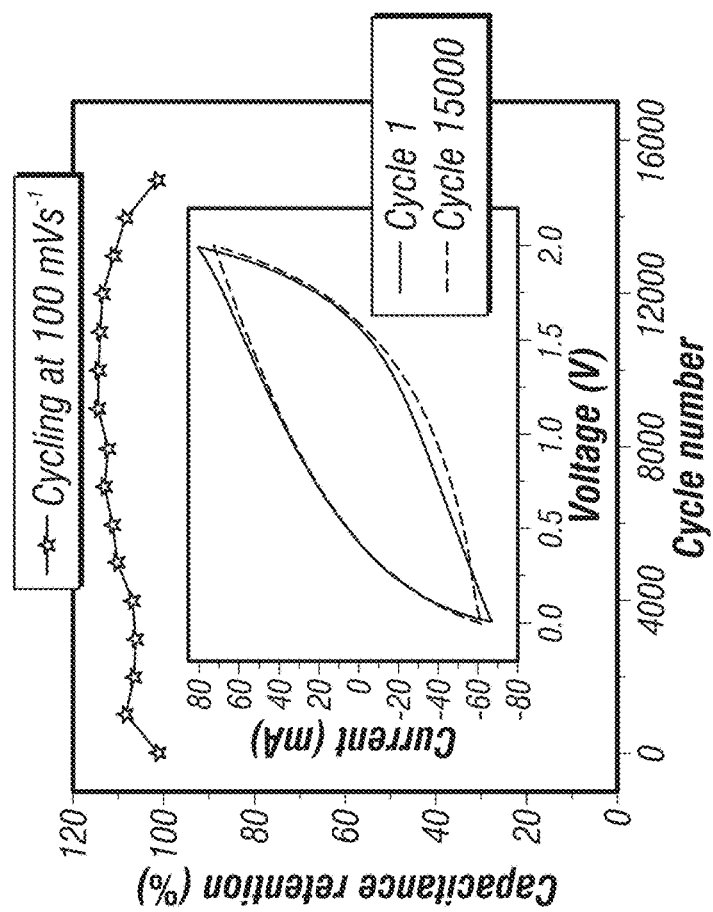
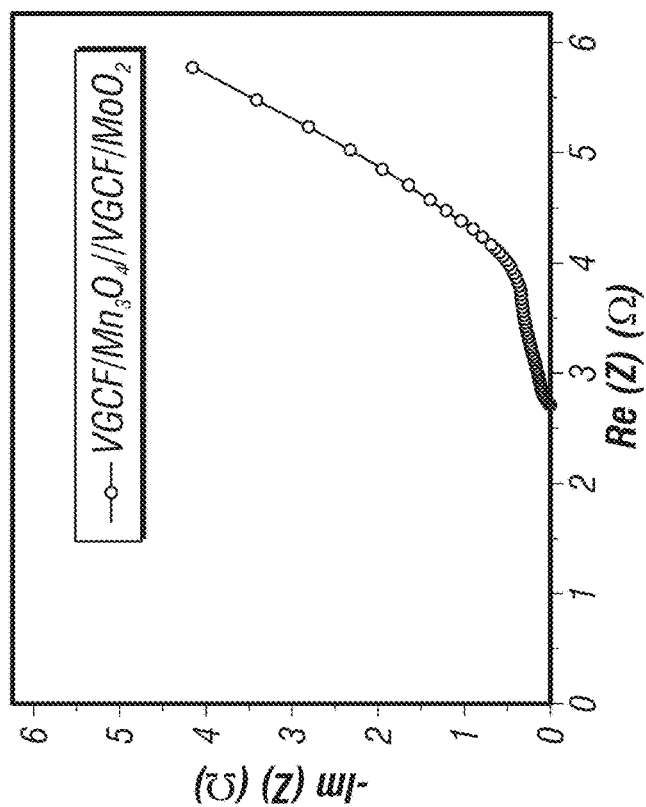
FIG. 8C
FIG. 8D

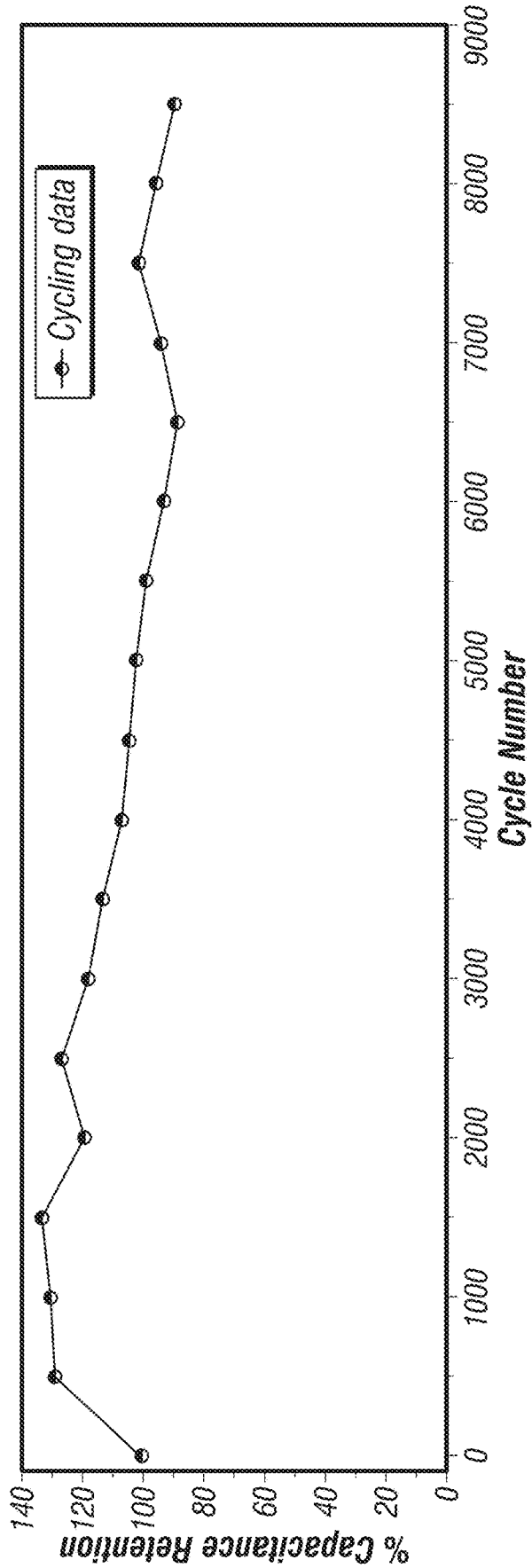
FIG. 11D
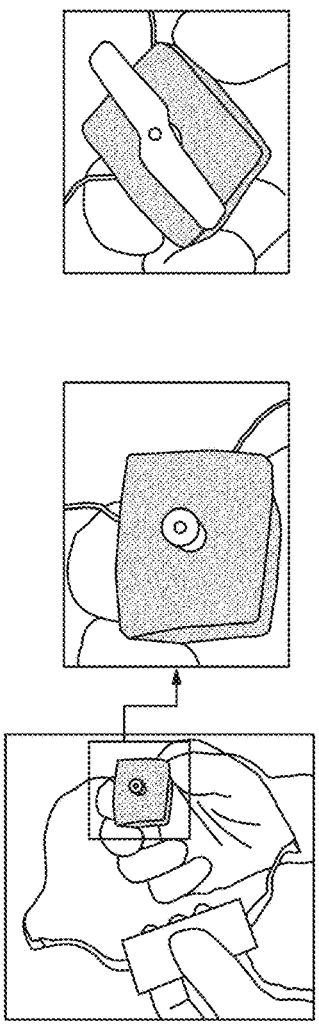
FIG. 11E
FIG. 11F
FIG. 11G
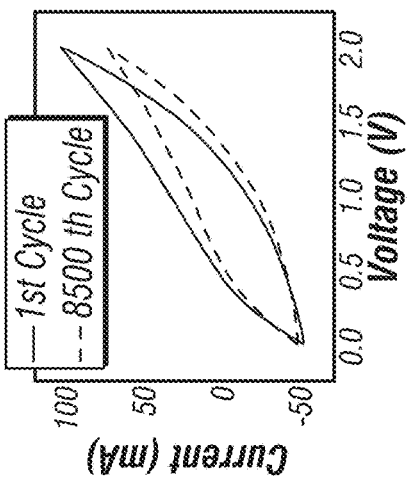
FIG. 11H ized composite fabrica-

DUAL FUNCTION ENERGY-STORING SUPERCAPACITOR-BASED CARBON FIBER COMPOSITE FOR BODY PANELS OF A VEHICLE

STATEMENT REGARDING FEDERALLY SPONSORED RESEARCH OR DEVELOPMENT

This invention was made with Government support under NSF Award #ECCS-1351757, awarded by the National Science Foundation. The Government has certain rights in the invention.

RELATED PATENTS AND APPLICATIONS

This disclosure relates to U.S. Provisional Patent Application No. 62/937,378 filed Nov. 19, 2019 and entitled "Vertically-Aligned Graphene-Carbon Fiber Hybrid Electrodes And Methods for Making Same"; U.S. patent application Ser. No. 16/951,150 filed Nov. 18, 2020 and entitled "Vertically-Aligned Graphene-Carbon Fiber Hybrid Electrodes And Methods for Making Same"; and U.S. Provisional Patent Application No. 63/109,441 filed Nov. 4, 2020 and entitled "Storing Energy in Carbon Fiber-Based Electric Vehicle Body Panels", the entire contents of all of which are hereby incorporated by reference in their entirety.

FIELD OF THE DISCLOSURE

The disclosure relates to a dual-function supercapacitor carbon fiber composite that can store electrical energy and function as the body shell of a vehicle, such as an electric vehicle.

BACKGROUND

Many existing car manufacturers have set a target to go fully electric by 2035. This is in addition to the several new electric vehicles (EVs) companies that have started in the last decade. This evident transition towards EVs from internal combustion engine (ICE) cars necessitates the development of new materials and design strategies in the energy storage industry. Currently, the best performing EVs in the market utilize batteries with a range of 250 to 400 miles/charge. A significant disadvantage of EVs is the long charging time. Longer charging times are directly related to the charging mechanism of batteries since the electrical energy is stored in the bulk of the electrode materials. Another disadvantage of the batteries is the low cycle life which is a few thousands of charge-discharge cycles. This leads to the requirement for EV battery replacement every 5 to 10 years depending on use. Another serious issue is the safety associated with the batteries' chemistry and design used in EVs, which can cause fire, life-threatening injuries, or death if ruptured. There have been reports on EVs bursting into flames in accidents due to the batteries carrying flammable and hazardous organic electrolytes. Moreover, since the batteries in these EVs were not an integral part of its structure, thousands of individual burning batteries can be hurled out and spread over the surrounding area.

Thus, there exists a need for an improved approach to store energy that can be used, for example, to power electric vehicles.

BRIEF DESCRIPTION OF THE DRAWINGS

A more complete understanding of the present disclosure, and the attendant advantages and features thereof, will be more readily understood by reference to the following description when considered in conjunction with the accompanying drawings wherein:

FIGS. 3A-3I show material and structural characterization of the VGCF/$Mn_3O_4$ electrode as follows: SEM of VGCF electrode showing graphene sheets vertically deposited on carbon fiber (FIG. 3A); XRD (FIG. 3B) and Raman (FIG. 3C) measurement of tetragonal hausmannite VGCF/$Mn_3O_4$ electrode; SEM images (FIG. 3D) depict uniform deposition of VGCF/$Mn_3O_4$ on carbon fibers with (FIG. 3E) outline box region showing the presence of VGCF nanosheets and (FIG. 3F) outline box region showing the growth of $Mn_3O_4$ nanoflowers and nanowires; TEM images (FIGS. 3G and 3H) depict the presence of graphene nanosheets uniformly covered with $Mn_3O_4$ nanosheets and nanowires; and EDAX images of the VGCF/$Mn_3O_4$ electrode showing the uniform distribution of the elements Mn, O and C (FIG. 3I).

FIGS. 5A-5F show: CV profile of performance comparison of VGCF and VGCF/$Mn_3O_4$ electrodes (FIG. 5A); CV profile of VGCF/$Mn_3O_4$ electrode optimization done at different hydrothermal deposition time from 0.5 hours to 7 hours (FIG. 5B); GCD profile of VGCF/$Mn_3O_4$ electrode optimization done at different hydrothermal deposition time from 0.5 hours to 7 hours (FIG. 5C); GCD profile of VGCF/$Mn_3O_4$ electrode optimization done at different precursor molar concentrations from 0.02 M to 0.06 M (FIG. 5D); CV profile of performance comparison of VGCF and VGCF/$MoO_2$ electrodes (FIG. 5E); and CV profile of VGCF/$MoO_2$ electrode optimization done at different electrochemical deposition time from 10 to 60 minutes (FIG. 5F).

FIGS. 8A-8F show electrochemical performance of asymmetric supercapacitor fabricated with VGCF/Mn$_3$O$_4$/VGCF/MoO$_2$ in 1 M Na$_2$SO$_4$ aqueous electrolyte as follows: CV profile recorded at scan rates from 5 to 100 mV s-1 (FIG. 8A); GCD profile recorded at current from 10 mA to 20 mA (FIG. 8B); Nyquist plot recorded from 1 MHz to 1 mHz (FIG. 8C); Cycling performed up to 15,000 cycles at a scan rate of 100 mV s-1 (FIG. 8D) with the inset showing CV profile comparison of pristine and 15,000 cycled electrode; b value measurement done at different potential (FIG. 8E); and CV profile showing charge storage contribution of capacitive type in the total charge stored (FIG. 8F).

Figure 9A:
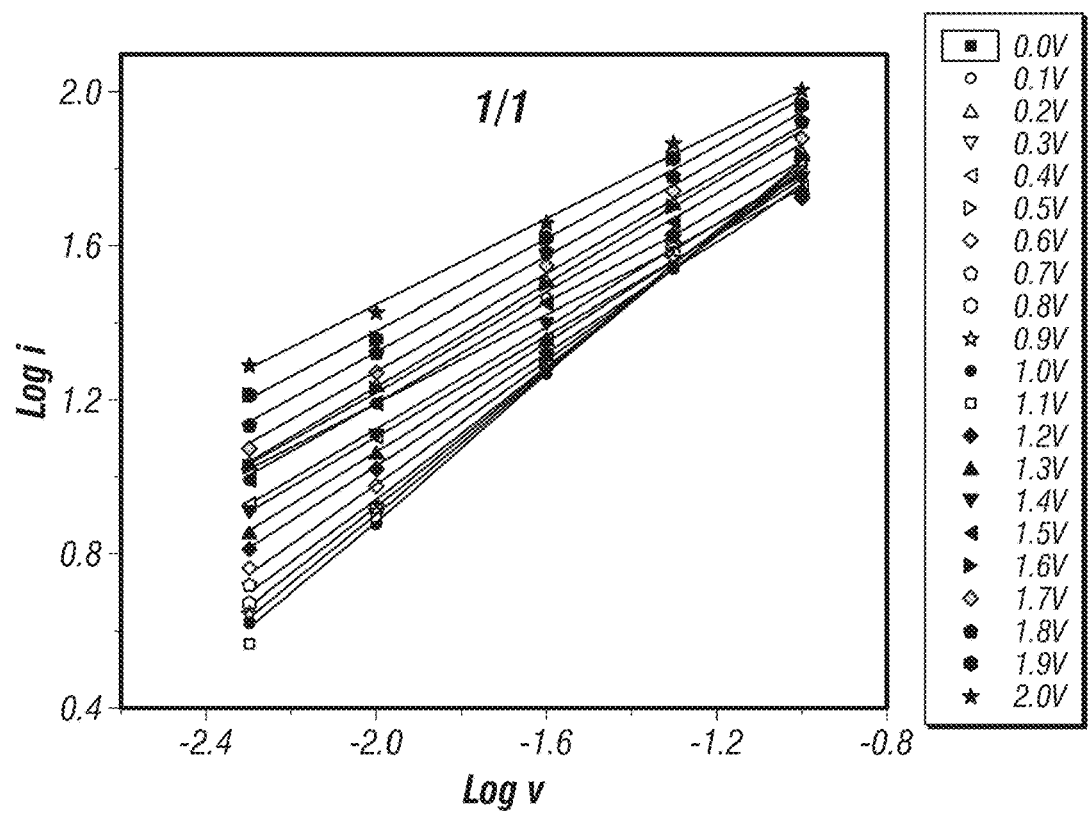
FIGS. 9A and 9B show charge storage contribution calculation images with: Plot of log i vs log v (FIG. 9A); and Plot of $$\frac{i(V)}{v^{1/2}}$$
Figure 9B:
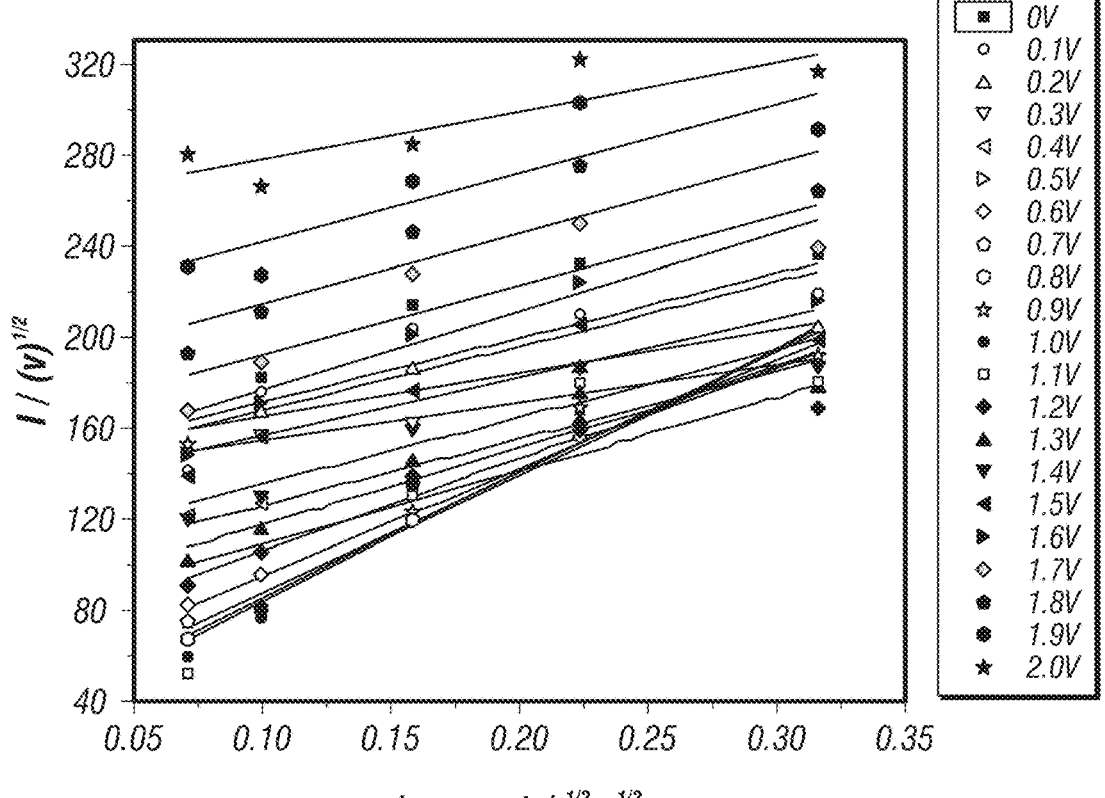

vs v$^{1/2}$ (FIG. 9B).

Figure 10:
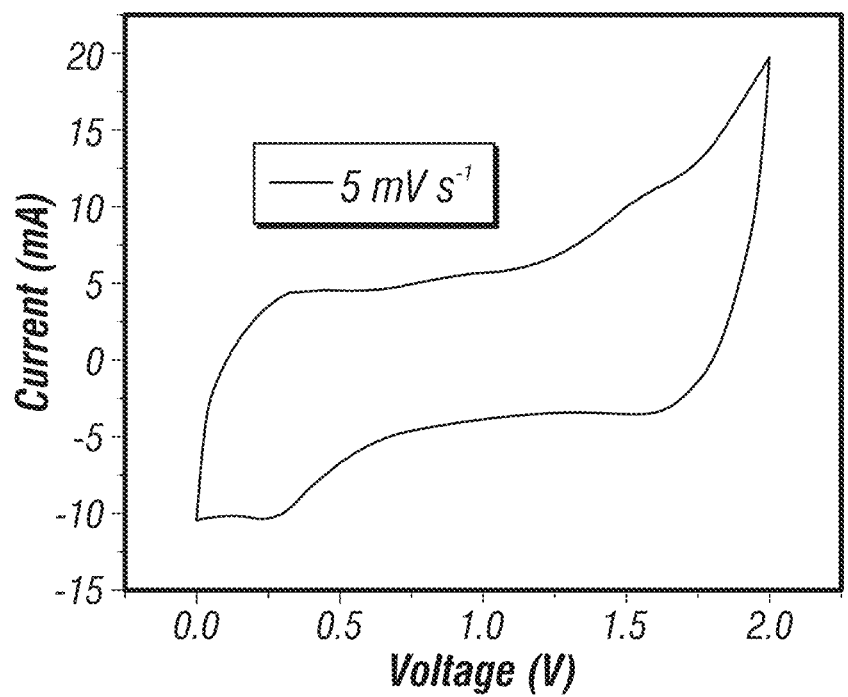

FIG. 10 shows CV at the scan rate of 5 mV s$^{-1}$ for asymmetric liquid cell.

Figure 11A:
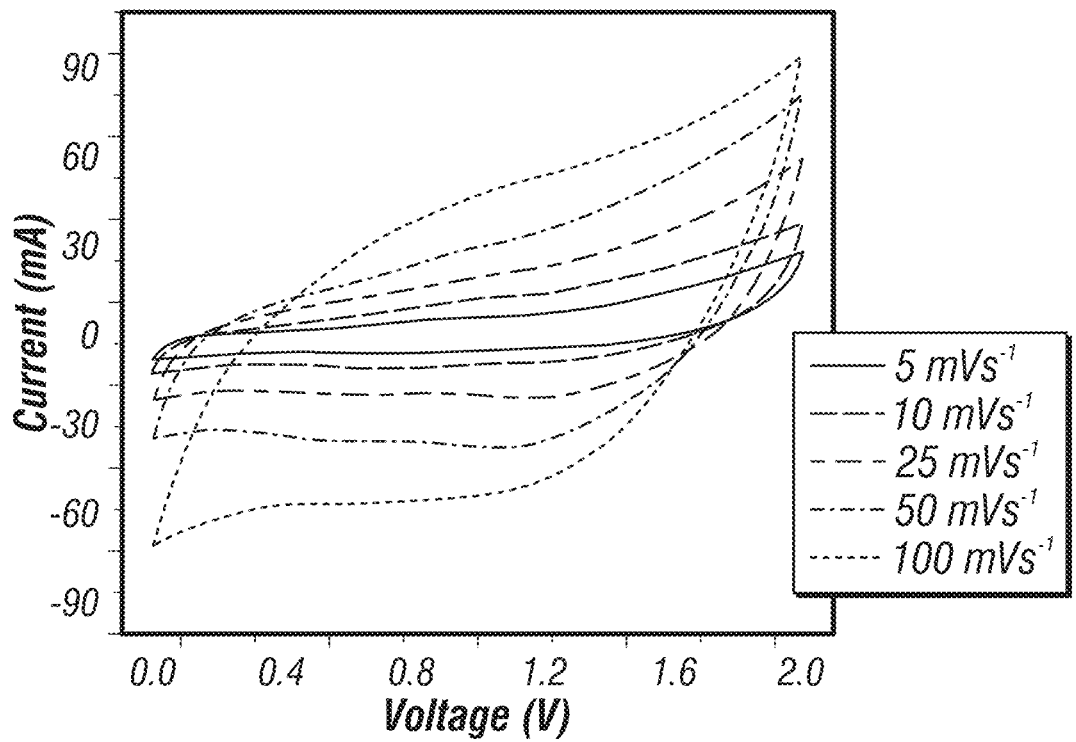
Figure 11B:
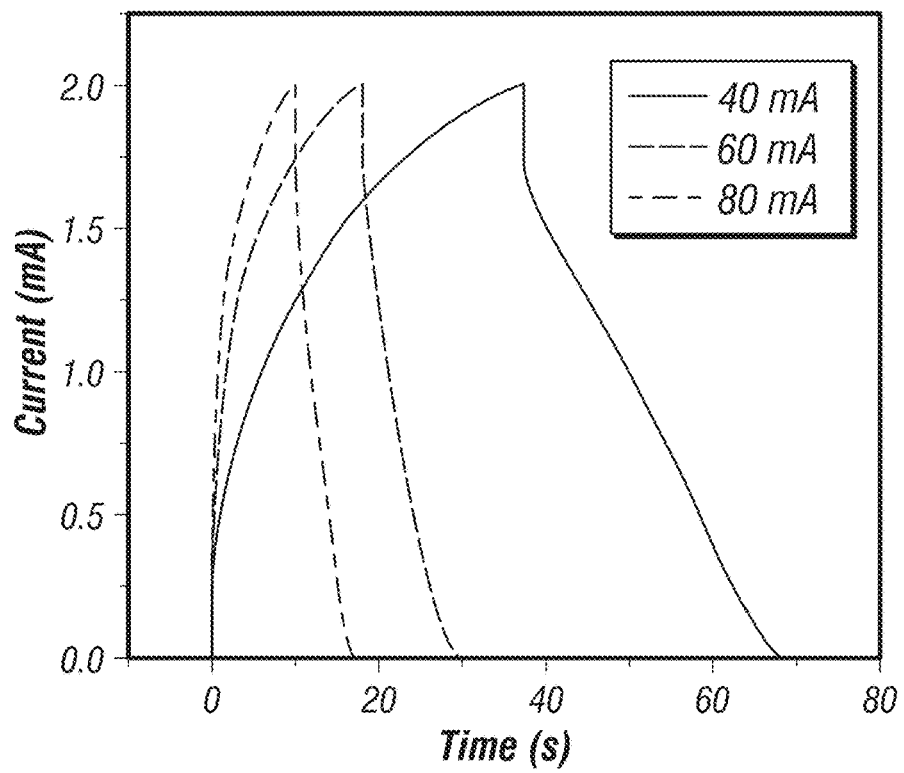
Figure 11C:
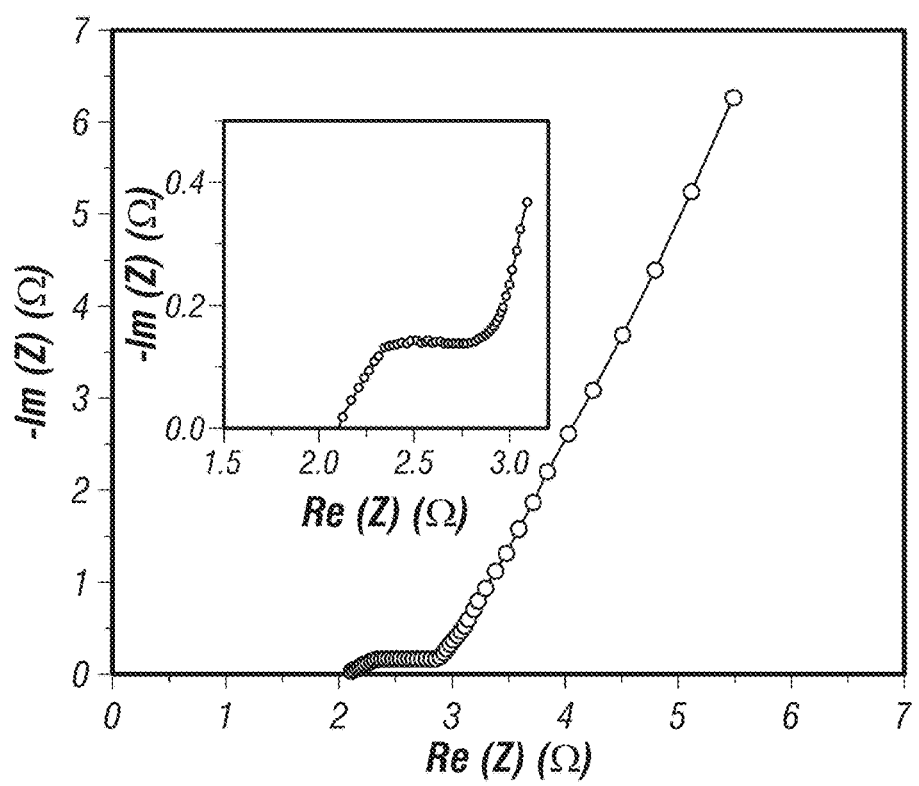

FIGS. 11A-11H show electrochemical performance of asymmetric energized composite supercapacitor of VGCF/Mn$_3$O$_4$/VGCF/MoO$_2$ in 1 M Na$_2$SO$_4$/PAM gel electrolyte as follows: CV profile recorded at scan rates from 5 to 100 mV s$^{-1}$ (FIG. 11A); GCD profile recorded at current from 40 mA to 80 mA (FIG. 11B); Nyquist plot recorded from 1 MHz to 1 mHz with inset showing the magnified portion of the high-frequency region (FIG. 11C); Cycling performed up to 8,500 cycles at a scan rate of 100 mV s$^{-1}$ (FIG. 11D); CV profile comparison of pristine and 8,500 cycled electrode (FIG. 11E); and an energized composite powering a toy drone propellor (FIG. 11F) with the toy drone propellor in running condition (FIG. 11G) and off condition (FIG. 11H).

Figure 12A:
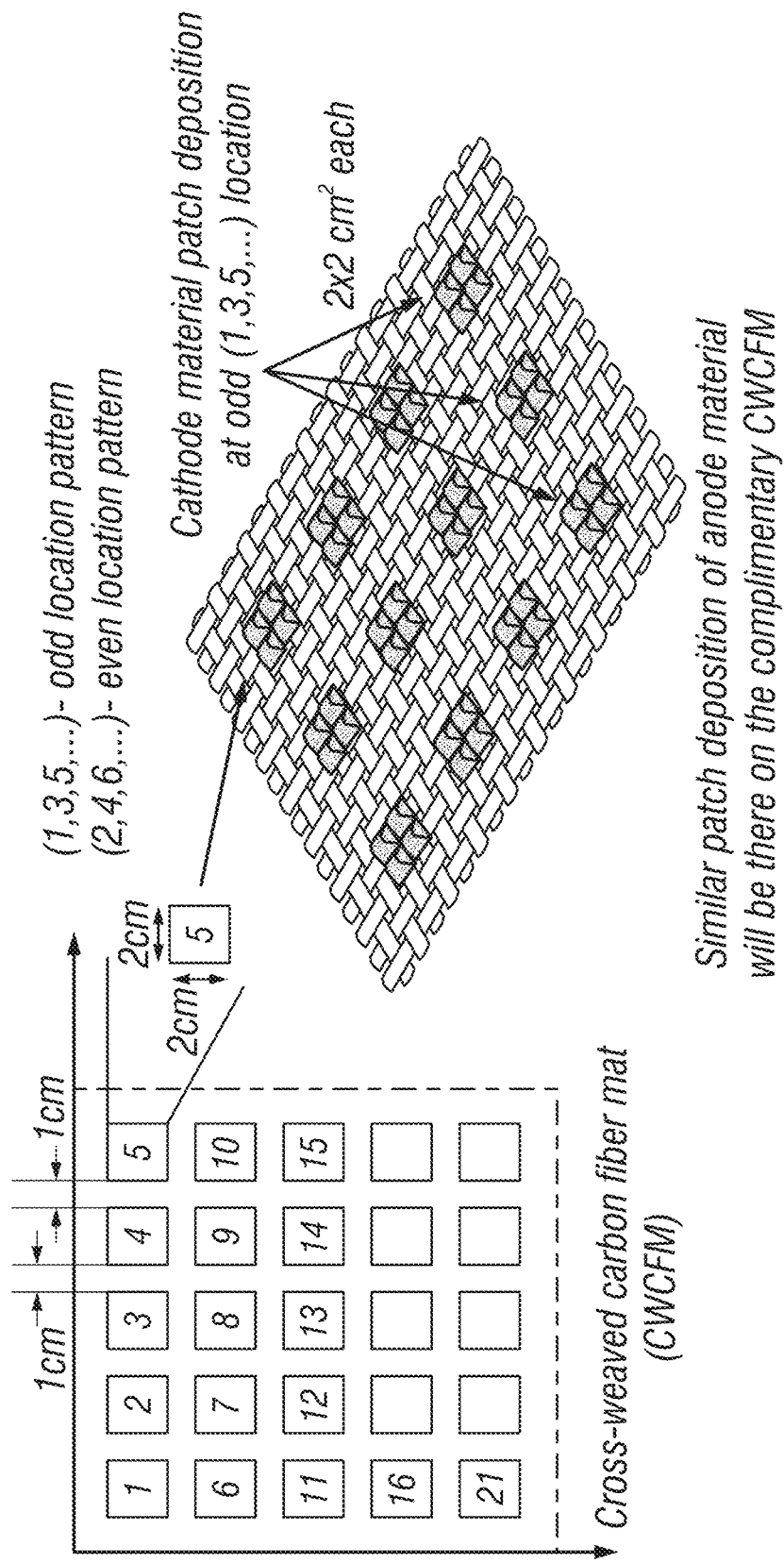

FIG. 12A shows odd & even location pattern for active material deposition on a cross-weaved carbon fiber mat.

Figure 12B:
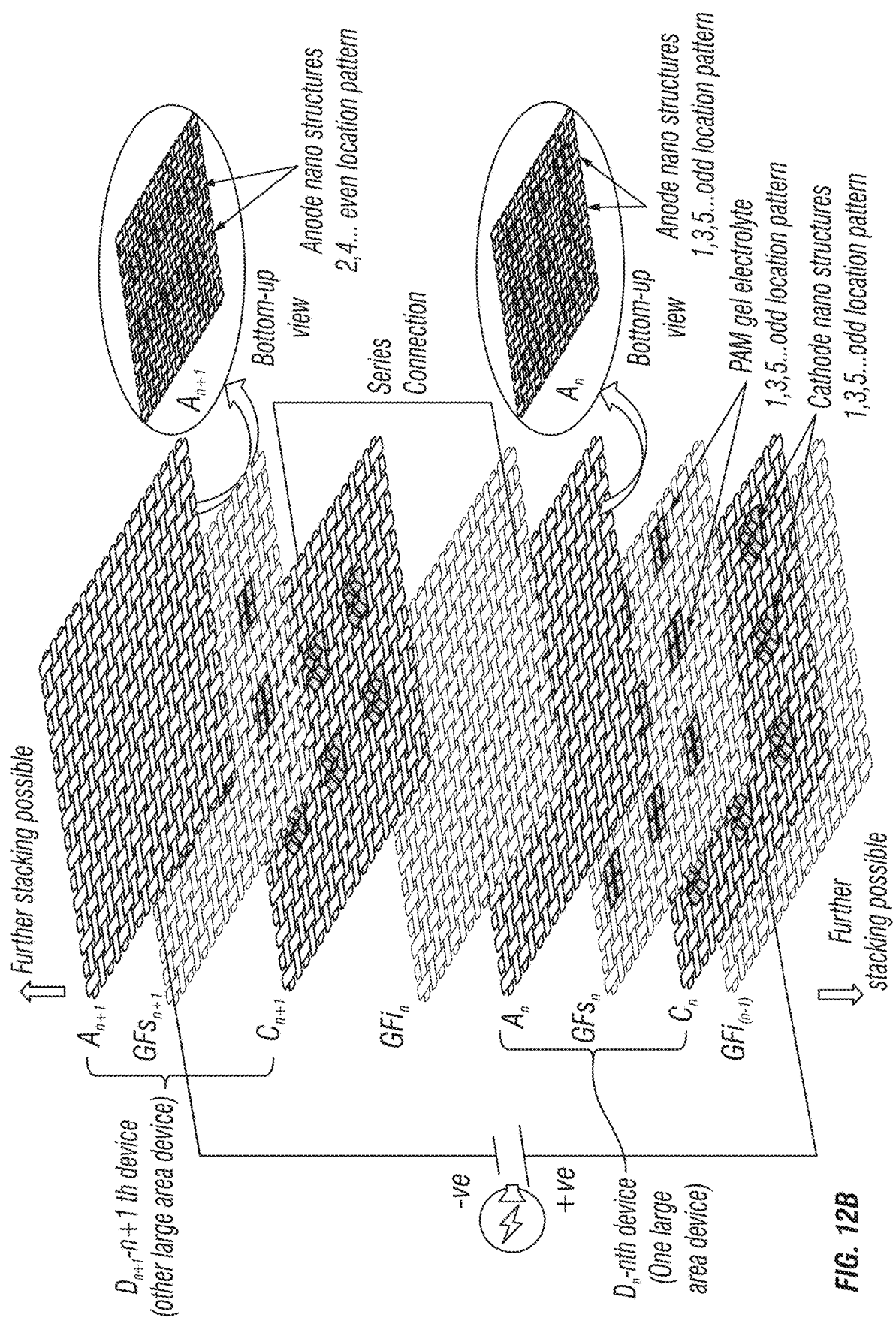

FIG. 12B shows stacking pattern of the anode and cathode carbon fiber mats to fabricate a large area energized composite.

Figure 13A:
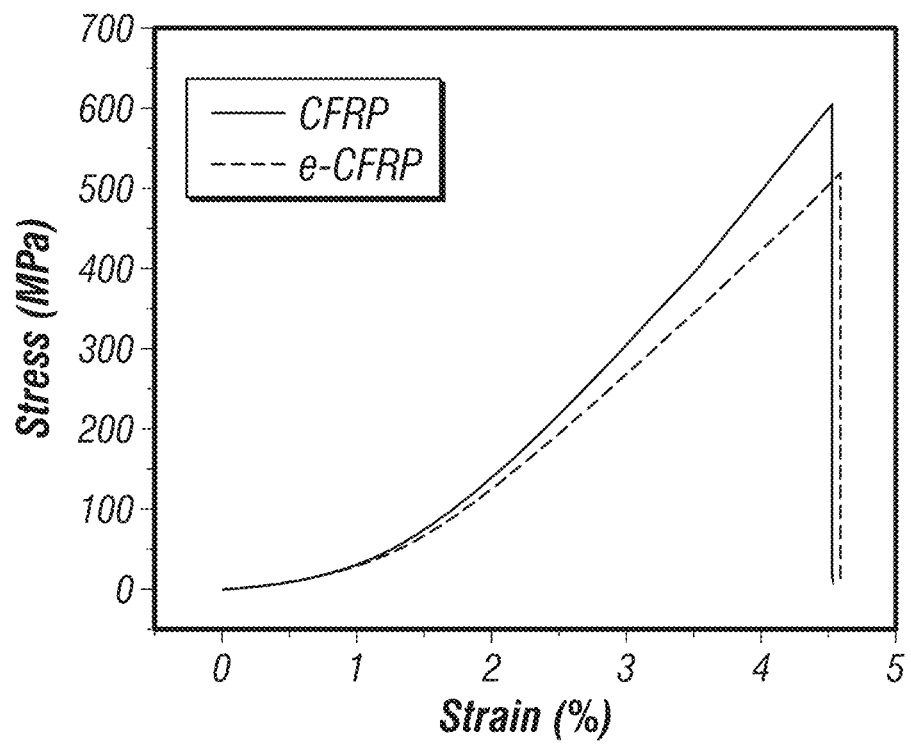
Figure 13B:
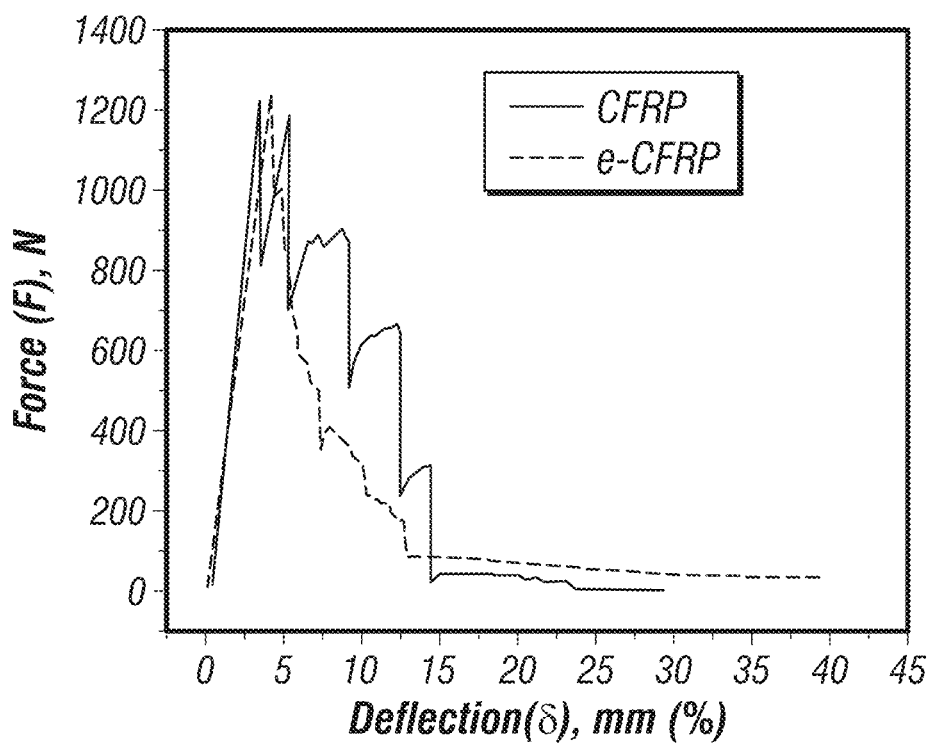
Figure 13C:
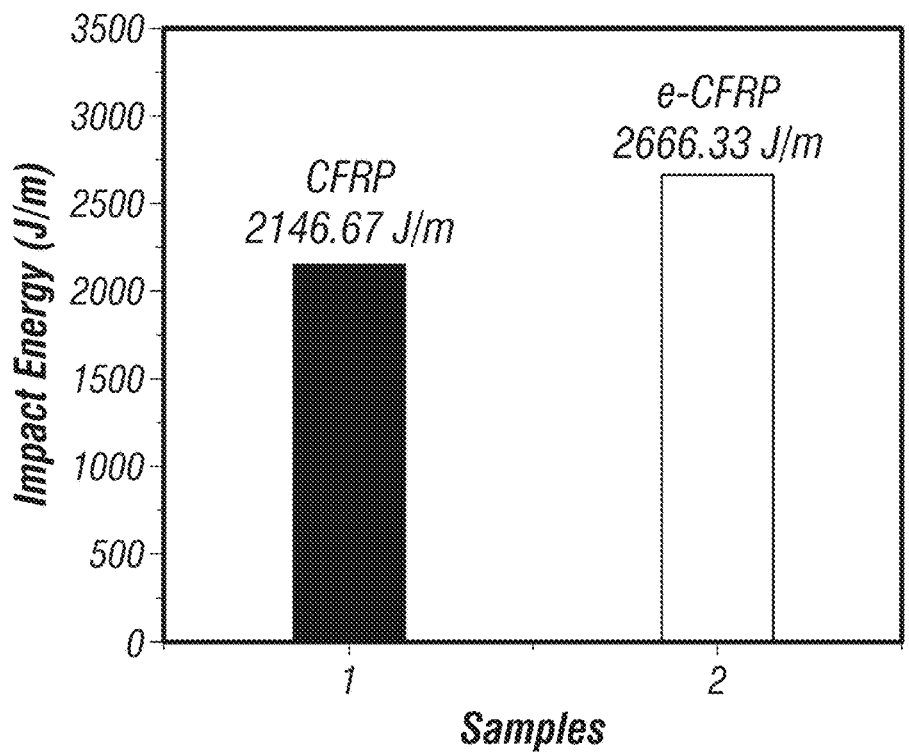

FIGS. 13A-13C show mechanical characterizations of the composite based on relevant ASTM standards as follows: Tensile test of the composite (FIG. 13A); 3-Point bend test of the composite (FIG. 13B); and Impact test of the composite (FIG. 13C).

Figure 13D:
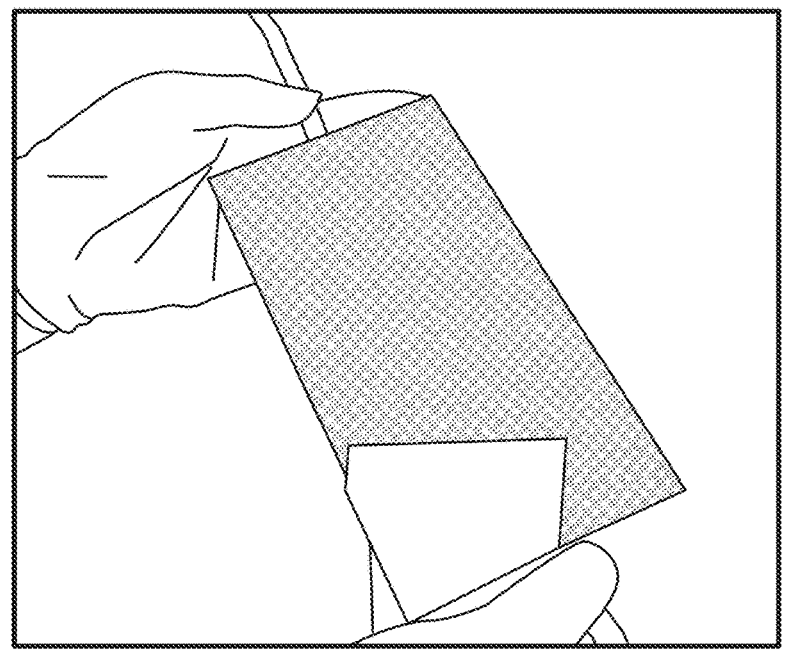
Figure 13E:
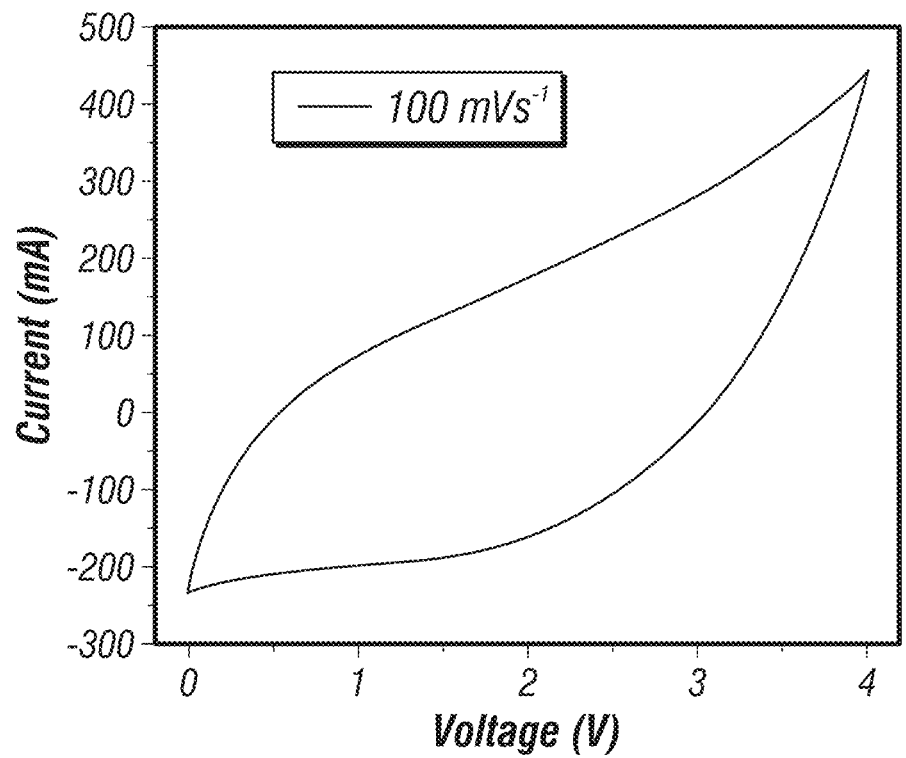
Figure 13F:
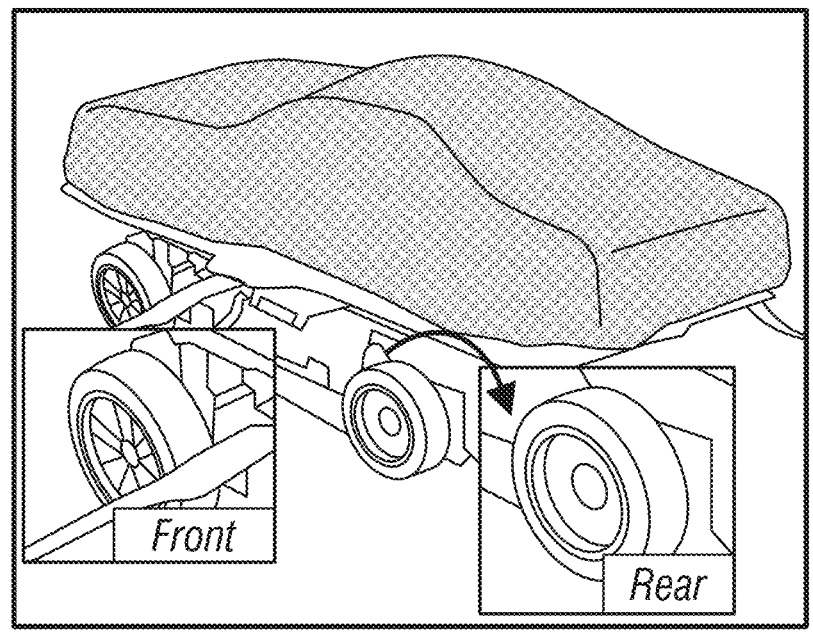
Figure 13G:
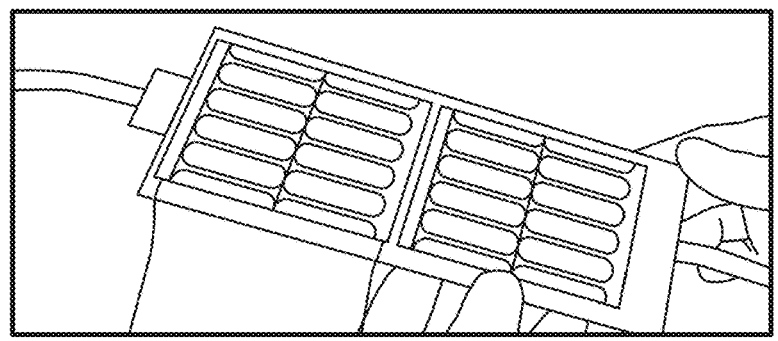
Figure 13H:
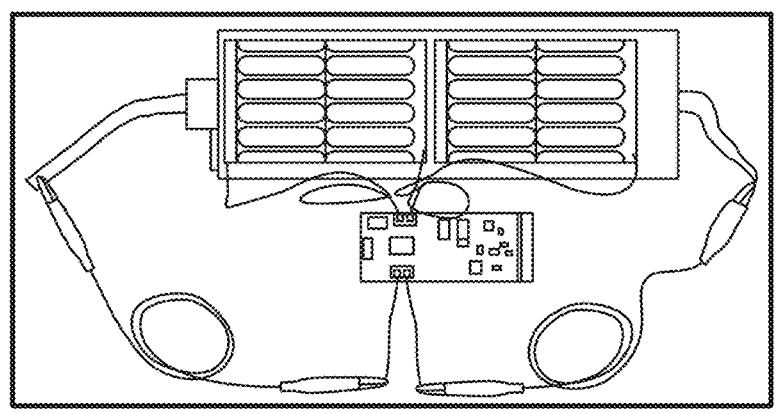
Figure 13I:
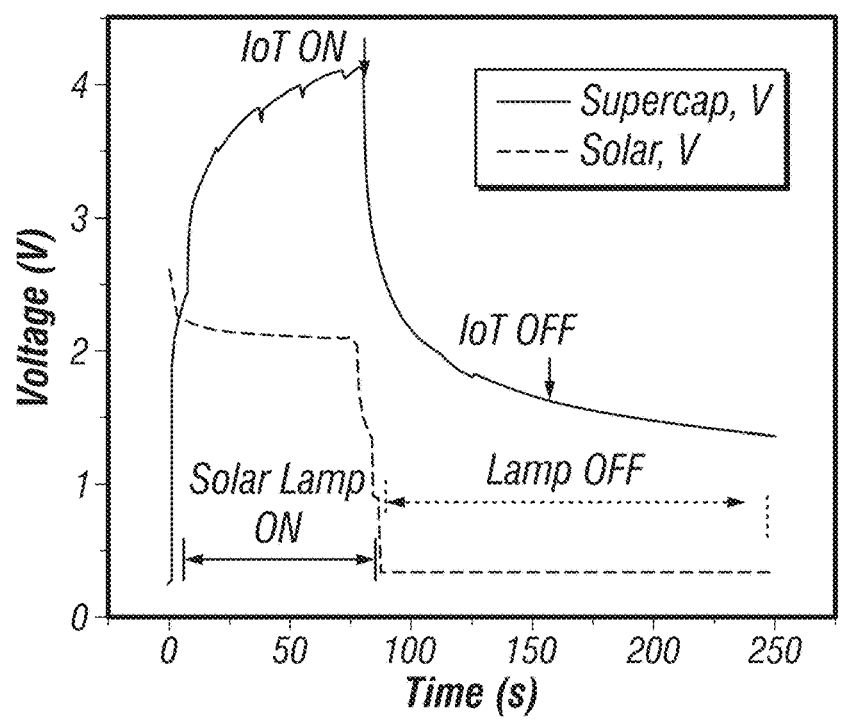
Figure 13J:
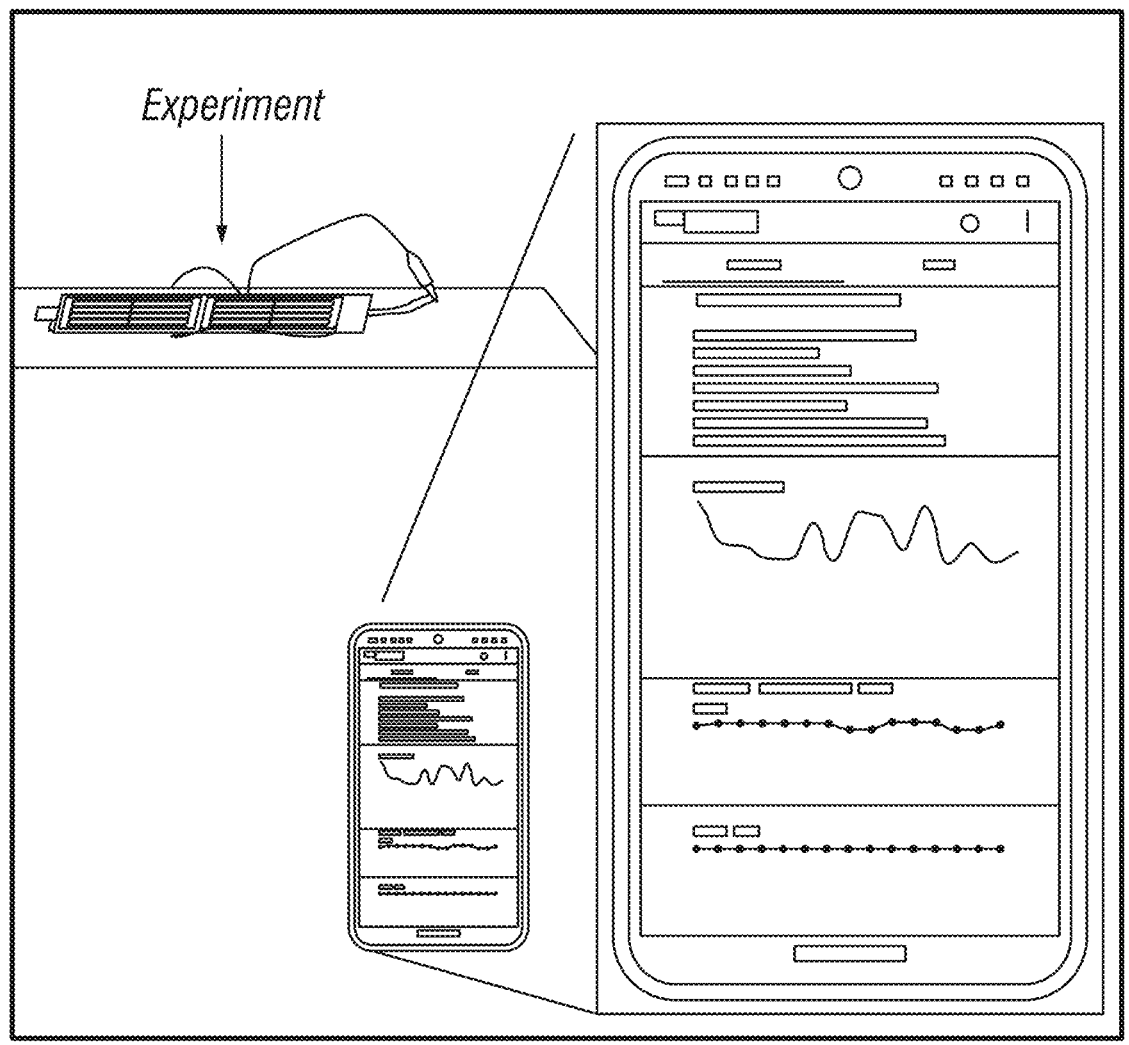

FIGS. 13D-13J show various applications of energized composite (EzCFRP): a 4V, 200 mA prototype of car's floor panel made by multilayer energized composite (FIG. 13D); CV profile of the 4V, 200 mA multilayer energized composite at a scan rate of 100 mV s-1 (FIG. 13E); toy car's rear wheel rotating (compared to stationary front wheels) using power from the car's floor panel (FIG. 13F); integrated solar cell and energized composite supercapacitor (FIG. 13G) with the integrated composite used to power an IoT device; Characteristic voltage vs time curve showing integrated solar cell charging the supercapacitors which then power the IoT device once solar lamp is Off (FIG. 13I); and the IoT device gathers all the information and transmits the data directly to a smartphone, which can be accessed using the android application developed by PowerFilm (FIG. 13J).

Figure 14A:
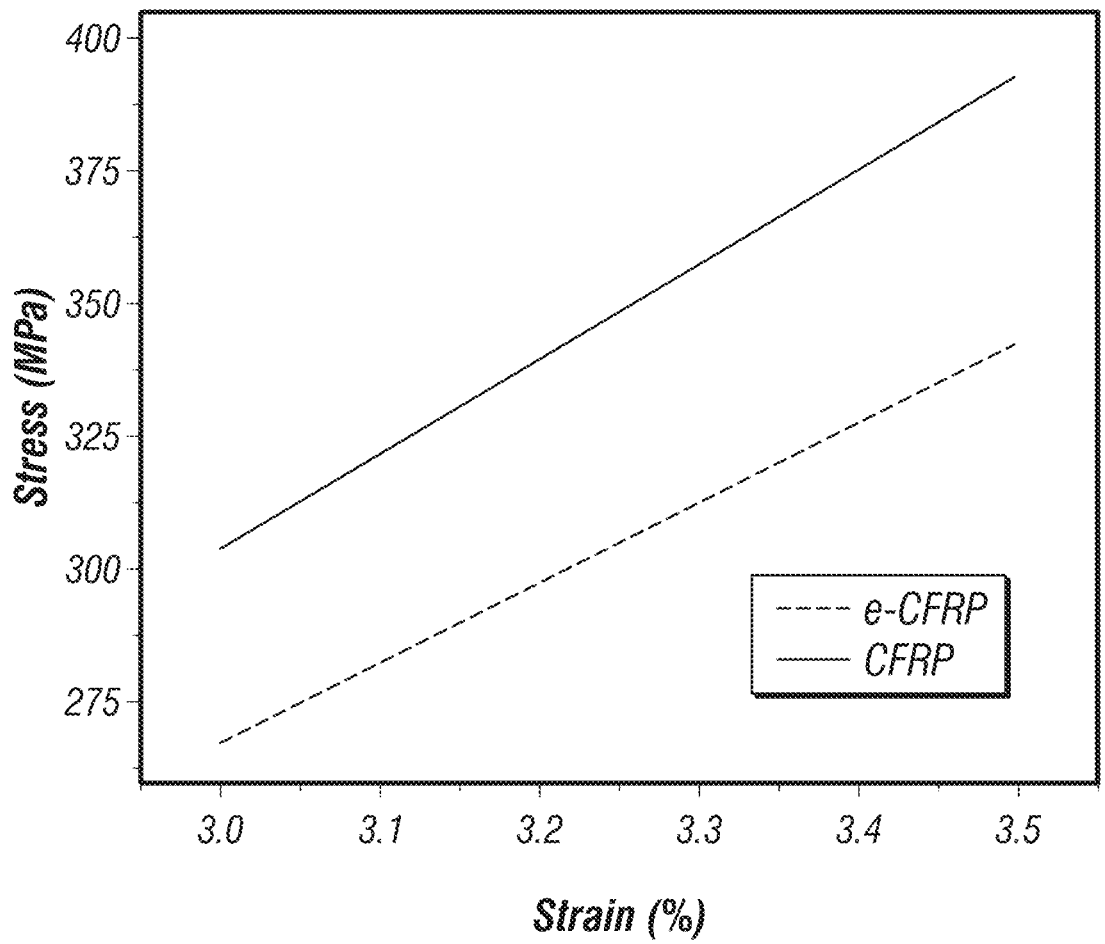
Figure 14B:
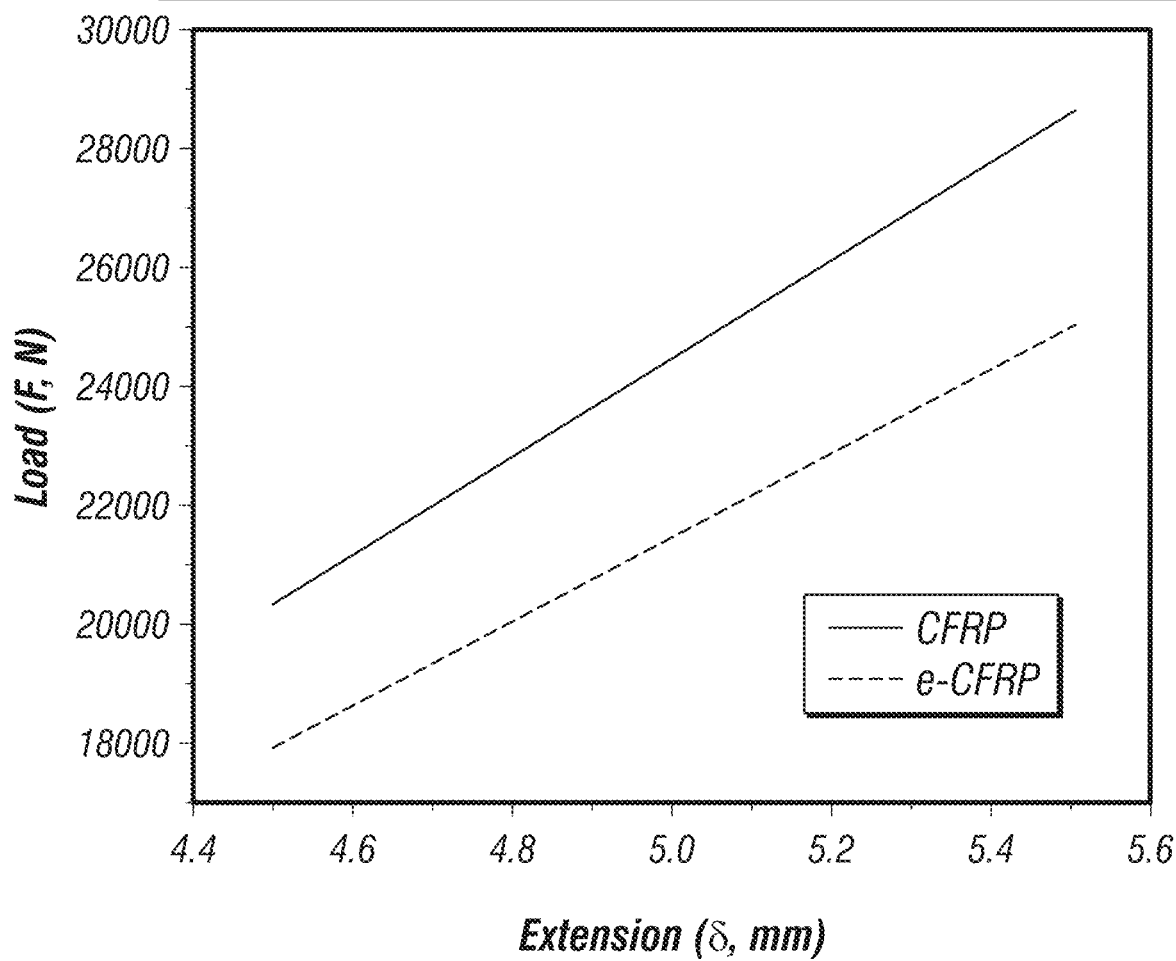

FIGS. 14A and 14B show calculations of Young's modulus (FIG. 14A); and longitudinal stiffness (FIG. 14B).

SUMMARY OF THE DISCLOSURE

One aspect of the disclosure relates to a method of making an energy storing carbon fiber reinforced polymer composite. The method comprising: depositing cathode material patches at spaced locations on a first cross-weaved carbon fiber mat to form a first cathode, with the deposited cathode material patches collectively having a first configuration; depositing anode material patches at spaced locations on a second cross-weaved carbon fiber mat to form a first anode, with the deposited anode material patches collectively having a second configuration that matches the first configuration; and stacking the first and second cross-weaved carbon fiber mats so that the cathode material patches substantially align with the anode material patches with a first separator cross-weaved glass fiber mat positioned between the first and second cross-weaved carbon fiber mats.

The first separator cross-weaved glass fiber mat includes electrolyte coating patches on both sides. The electrolyte coating patches have a third configuration that matches the first and second configurations. The spaces between the cathode material patches, the anode material patches, and the electrolyte coating patches include a filler material.

In one embodiment, the method further comprises: depositing cathode material patches at spaced locations on a third cross-weaved carbon fiber mat to form a second cathode, with the deposited cathode material patches collectively having a fourth configuration; depositing anode material patches at spaced locations on a fourth cross-weaved carbon fiber mat to form a second anode, with the deposited anode material patches collectively having a fifth configuration that matches the fourth configuration; stacking the third and fourth cross-weaved carbon fiber mats so that the cathode material patches substantially align with the anode material patches with a second separator cross-weaved glass fiber mat positioned between the third and fourth cross-weaved carbon fiber mats; stacking the stacked third and fourth cross-weaved carbon fiber mats and second separator cross-weaved glass fiber mat and the stacked first and second cross-weaved carbon fiber mats and first separator cross-weaved glass fiber mat with a first insulator cross-weaved glass fiber mat positioned between the second and third cross-weaved carbon fiber mats; and electrically connecting the first and fourth cross-weaved carbon fiber mats in series.

The second separator cross-weaved glass fiber mat includes electrolyte coating patches on both sides, with the electrolyte coating patches having a sixth configuration that matches the fourth and fifth configurations. The spaces between the cathode material patches, the anode material patches, and the electrolyte coating patches include a filler material.

In exemplary embodiments, the filler material comprises an epoxy resin and/or the electrolyte coating patches comprise a PAM gel electrolyte.

Another aspect of the disclosure relates to an energy storing carbon fiber reinforced polymer composite comprising: a first cathode including cathode material patches at spaced locations on a first cross-weaved carbon fiber mat, with the deposited cathode material patches collectively having a first configuration; a first anode including anode material patches at spaced locations on a second cross-weaved carbon fiber mat, with the deposited anode material patches collectively having a second configuration that matches the first configuration; and a first separator cross-weaved glass fiber mat positioned between the first and second cross-weaved carbon fiber mats.

The first and second cross-weaved carbon fiber mats are stacked so that the cathode material patches substantially align with the anode material patches. The first separator cross-weaved glass fiber mat includes electrolyte coating patches on both sides, with the electrolyte coating patches having a third configuration that matches the first and second configurations. The spaces between the cathode material patches, the anode material patches, and the electrolyte coating patches include a filler material.

In one embodiment, the composite further comprises a second cathode including cathode material patches at spaced locations on a third cross-weaved carbon fiber mat, with the deposited cathode material patches collectively having a fourth configuration; a second anode including anode material patches at spaced locations on a fourth cross-weaved carbon fiber mat, with the deposited anode material patches collectively having a fifth configuration that matches the fourth configuration; and a second separator cross-weaved glass fiber mat positioned between the third and fourth cross-weaved carbon fiber mats.

The third and fourth cross-weaved carbon fiber mats are stacked so that the cathode material patches substantially align with the anode material patches. The stacked third and fourth cross-weaved carbon fiber mats and second separator cross-weaved glass fiber mat and the stacked first and second cross-weaved carbon fiber mats and first separator cross-weaved glass fiber mat are stacked with a first insulator cross-weaved glass fiber mat positioned between the second and third cross-weaved carbon fiber mats. The first and fourth cross-weaved carbon fiber mats are electrically connected in series. The second separator cross-weaved glass fiber mat includes electrolyte coating patches on both sides, with the electrolyte coating patches having a sixth configuration that matches the fourth and fifth configurations. The spaces between the cathode material patches, the anode material patches, and the electrolyte coating patches include a filler material.

In exemplary embodiments, the filler material comprises an epoxy resin and/or the electrolyte coating patches comprise a PAM gel electrolyte.

Another aspect of the disclosure relates to an energy storing device panel, such as an electric vehicle body panel, comprising the disclosed carbon fiber reinforced polymer composite.

DETAILED DESCRIPTION

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. The term plurality, as used herein, is defined as two or more than two. The term another, as used herein, is defined as at least a second or more.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/–" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed are not necessarily the order in which they are performed.

In general, the disclosure relates to an energy-storing carbon fiber-based composite to address at least some of the issues set forth in the Background Section. Hereafter, referred to as energized carbon fiber composites, the disclosed composites provide a dual function: energy storage and structural body panels (replacing steel and aluminum panels) for EVs. In addition, this energized carbon fiber composite makes the car lighter in weight which again facilitates increasing miles per charge. The energy storage function is offered by the supercapacitors developed using carbon fiber and active electrode materials. The composite's mechanical strength arises from the carbon fibers of the electrodes to form a high tensile and impact strength re-enforced polymer composite, which is exceptionally lightweight compared to the traditional steel automobile frame. The high strength is facilitated by fabricating a unique location pattern design of alternate multilayer epoxy and active electrode material as discussed herein. A few car manufacturers are already replacing the existing steel or aluminum body panels with carbon fibers to make the cars lighter and enhance fuel efficiency. Therefore, adding the energy storage component with the carbon fiber body panels would be highly advantageous in making the vehicle lightweight and enhancing the overall range and charging time of the current EVs. This energized composite does not compromise on either its functionality, charge storage, or mechanical strength when developed into a single product. Moreover, it brings several other commercial values to its application, including, but not limited to a) easy processing and scalability, b) low cost of chemicals and scalable electrode deposition methods, c) fast charging (supercapacitors allows very fast charging compared to conventional batteries), d) high cycle life (no replacement of body panels required during the lifetime of the EVs), e) high power density, broad working temperature range. and f) safer since aqueous gel electrolytes are used. Thus, the energized composite can offer a single solution for many problems faced by EVs.

Commercial supercapacitors typically use symmetric carbon/carbon electrodes with organic or ionic liquid electrolytes to achieve high voltage and energy. To use them as the structural component such as body panels of EVs, the organic electrolyte can be replaced with an aqueous electrolyte for safety reasons. The aqueous electrolyte has a voltage limit of 1.23 V due to the thermodynamic breakdown potential of water. A known approach to address this issue is developing an aqueous asymmetric supercapacitor with two different electrode materials as anode and cathode. The electrode materials should be chosen based on their energetics to offer high voltage as energy density is $\frac{1}{2}CV^2$, where C is the capacitance and V is the output voltage. Recent studies showed that the metal oxide electrodes with a large work function difference offer higher voltage. In an exemplary embodiment, manganese oxide with 4.40 eV and molybdenum oxide with 6.90 eV are used as positive and negative electrode materials, respectively. These metal oxides are cheaper, easy to synthesize and provide high capacitance through pseudocapacitive charge storage mechanism.

Figure 1A:
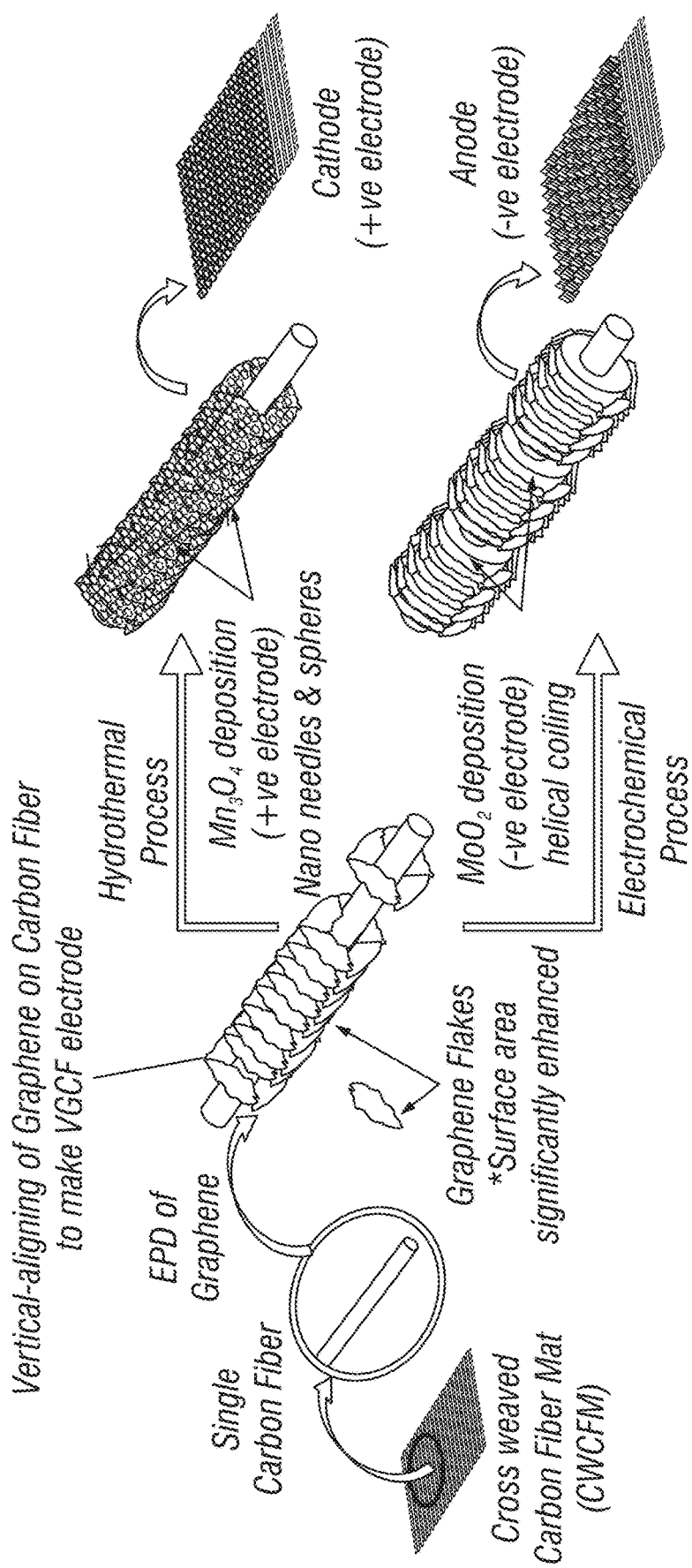
FIG. 1A schematically shows electrode preparation and FIG. 1B schematically shows energized composite fabrication and application.

Though these metal oxides (MO) offer high capacitance, they still suffer from poor conductivity. To address this issue, electrically conducting, vertically attached graphene nanosheets on carbon fibers (VGCF) prepared via electrophoretic deposition were used as a template for metal oxide deposition, as shown in FIG. 1A. This VGCF nanostructure provides 3D nanoporous architecture allowing better diffusion and transport of electrolyte ions, thus enhancing the charge storing ability. The strong vertical attachment of the graphene nanosheets helps in preventing restacking issues, thus maintaining the surface area for hundreds of thousands of charge-discharge cycles. The optimum deposition conditions chosen for the metal oxides provide uniform deposition over VGCF, thus mitigating the poor conductivity issues. This is evident from the lower charge transfer resistance for the individual electrodes. Furthermore, our previous work on VGCF demonstrated that the vertically attached configuration of graphene nanosheets allows easy accessibility for electrolyte ions without disrupting the graphene alignment, thereby providing an unprecedented cycle life of 100,000. This is also true for the present VGCF/metal oxide asymmetric device, which was cycled 15,000 times with no capacitance degradation. The asymmetric device developed with VGCF/$Mn_3O_4$ and VGCF/$MoO_2$ electrodes delivered a voltage of 2.0 V in 1 M $Na_2SO_4$ electrolyte and exhibited a superior areal capacitance of 645 mF $cm^{-2}$ with an ultra-high areal energy density of 0.36 mWh $cm^{-2}$ and a high power density of 25.5 mW $cm^{-2}$.

Figure 1B:
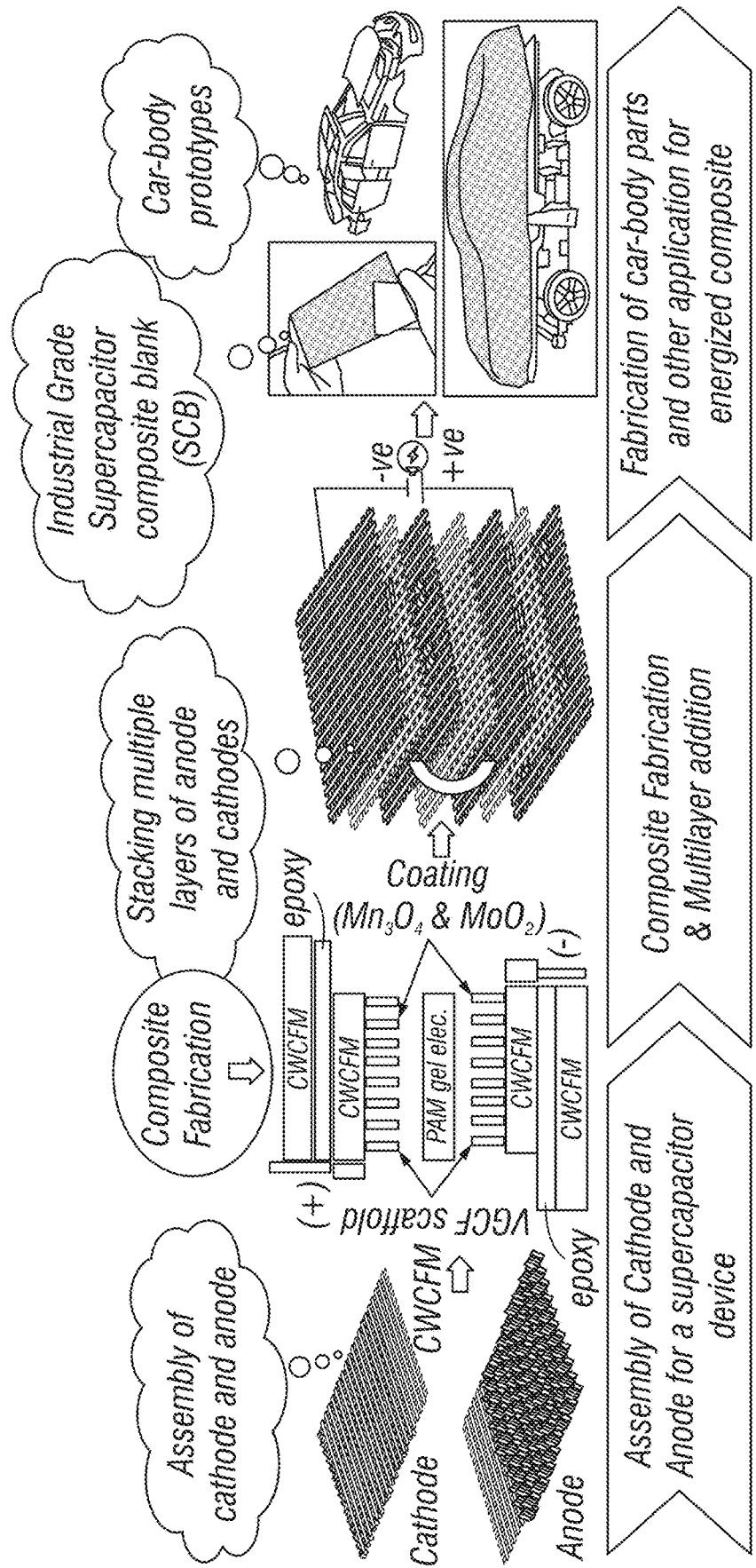

The asymmetric device made of the VGCF/$Mn_3O_4$ and VGCF/$MoO_2$ electrodes was assembled using polymer gel electrolyte and was further developed into the commercial-grade composite using epoxy resin and hardener. Several of these devices were connected via series and parallel connections depending on the power needs of the application, as shown in the energized composite fabrication and application section of FIG. 1B. When subjected to various ASTM industry-standard mechanical testing, the energized composites demonstrated performance values very close to commercial-grade carbon fiber composites. The energized composites possessed a tensile strength of 518 MPa, a flexural strength of 477.75 MPa, and impact strength (in terms of the impact energy absorbed) of 2666.33 J/m. These results showed that the dual-functional energized composites have promising applications in the EV industry. In addition to EV applications, these composites can also be employed in space applications like CubeSats (cubic satellites) and space vehicles, commercial flights, internal linings of military tanks, and portable electronics. The aviation industry could also significantly benefit from using these energized composites. Currently, 50% of the Boeing 787 Dreamliner fuselage is made with regular carbon fiber composites. Replacing them with these energized composites would allow the energy stored in these composites to operate emergency exit doors and inflators, internal lighting arrangements and other electronic items.

The disclosed energized carbon fiber composites will now be described with reference to non-limiting examples of preparation, materials and structural characterization, electrochemical characterization, design and fabrication, mechanical characterization, applications, and comparison to existing technologies.

Preparation of VGCF Electrode

The VGCF electrode was prepared through electrophoretic deposition using cross weaved carbon fiber mat (CWCFM: 3K, 2X2 Twill weave 5-yard roll from Fibreglast), as received from Kennedy Space Center (KSC-NASA), Florida. A 3 cm×2 cm piece of it was used as a working electrode (with 2 cm×2 cm as deposition area, extra 1 cm length for taking contact) and platinum foil as the counter electrode. The electrolyte solution is made of graphene and 5 mM nickel nitrate hexahydrate ultrasonically mixed in isopropyl alcohol. The deposition is done at a constant voltage of 50 V for 30 minutes. After the deposition, the VGCF electrode is dried in a conventional oven at 100° C. for 2 hours.

Preparation of VGCF/$Mn_3O_4$ Electrode

The VGCF/$Mn_3O_4$ electrode was prepared by growing nanostructures of $Mn_3O_4$ on the fabricated VGCF electrode, using hydrothermal deposition technique. The VGCF electrode was dipped in a 0.06 M potassium permanganate solution (in DI water) in a Teflon-lined container of the reactor, which was then kept in an oven at a constant temperature of 180° C. for 4 hours. The VGCF/$Mn_3O_4$ electrode is then cleaned in DI water and kept for drying in a conventional oven at 100° C. for 2 hours. To optimize the best performance of VGCF/$Mn_3O_4$ electrode different hydrothermal deposition time was chosen ranging from 30 minutes to 7 hours and the concentration of potassium permanganate solution was also varied from 0.02 M to 0.06 M.

Preparation of VGCF/$MoO_2$ Electrode

The VGCF/$MoO_2$ electrode was prepared by electrochemically depositing $MoO_2$ on the vertically stacked graphene of the VGCF electrode. The electrolyte for $MoO_2$ deposition is prepared by mixing 0.10 M sodium molybdate, 0.10 M ethylenediaminetetraacetic acid disodium and 0.10 M ammonium acetate solution in DI water. A three-electrode setup is used for deposition with VGCF as working electrode, platinum foil as counter electrode and Ag/AgCl as the reference electrode. The deposition is done at a constant voltage of −2 V with varying deposition time ranging from 10 minutes to 60 minutes to optimize the performance. The VGCF/MoO$_2$ electrode is further cleaned in DI water and kept for drying in a conventional oven at 100° C. for 2 hours.

Liquid State Asymmetric Device And Electrochemical Characterization

All the electrodes developed via optimizations and liquid state final asymmetric device were first tested in a three-electrode configuration using electrode material (VGCF, VGCF/Mn$_3$O$_4$, VGCF/MoO$_2$) as the working electrode, platinum foil as the counter electrode and Ag/AgCl as the reference electrode. A 1 M Na$_2$SO$_4$ electrolyte solution is used for three-electrode testing and asymmetric cell testing. The energized composite is prepared using a 1 M PAM/Na$_2$SO$_4$ gel electrolyte with a glass fiber separator between the active electrodes. The charge balance between the electrodes was performed to fabricate ASC using the following relation, $$q^+ = q^-$$

$$A^+ \times C^+ \times \Delta E^+ = A^- \times C^- \times \Delta E^-$$

Where q$^+$ and q$^-$ denotes the charges stored on the positive and negative electrodes, respectively. The signs A, C, and ΔE represent the active electrode area, specific capacitance, and the stable potential window of the respective electrodes.

Synthesis of Gel Electrolyte

In order to make a solid-state asymmetric supercapacitor device, standard 1 M sodium sulfate (Na$_2$SO$_4$) gel electrolyte was prepared with the help of polyacrylamide (PAM) gel. To prepare the gel electrolyte, first 7.1 g of Na$_2$SO$_4$ was dissolved in a 50 ml DI water solution. Further, 1.5 g of powdered PAM was added to the solution, which was then kept for stirring for 45 mins on a hot plate at a temperature of 85° C. This formed a uniform and moderately viscous gel electrolyte.

Fabrication of the Solid-State-Energized Composite Blank (ECB)

An energized composite blank was made using VGCF/Mn$_3$O$_4$ and VGCF/MoO$_2$ as active materials on a cross-weaved carbon fiber mat (CWCFM, bought from Fibreglast) as encapsulating layer. The method as shown in FIGS. 2A-2F and as set forth below describes how a solid-state single-layer device was fabricated. Note that a single layer device refers to a set of one anode mat, one cathode mat and a separator glass fiber mat with gel electrolyte.

Figure 2C:
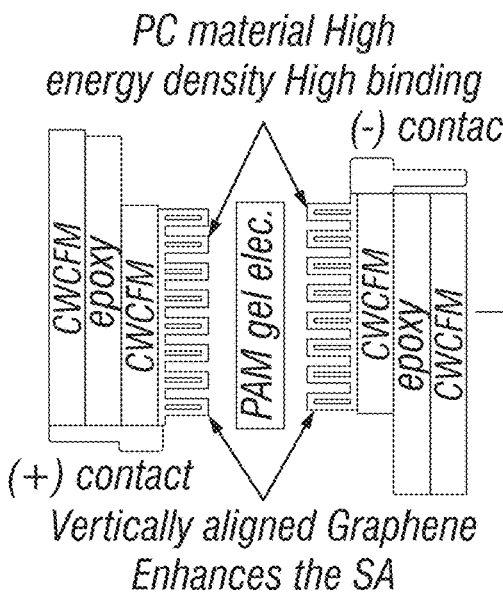
FIGS. 2A-2D show development of ECB blank as follows: a single layer of CWCFM (FIG. 2A); applying epoxy for composite preparation (FIG. 2B); vertically aligning graphene and depositing active metal oxides (FIG. 2C); making an ECB blank composite (FIG. 2D); hot pressing SCB (FIG. 2E); and tilted angle and side views of a final working energy-storing ECB composite (FIG. 2F).
Figure 2D:
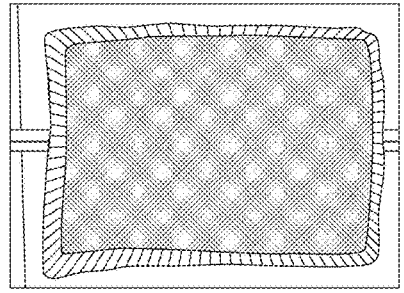
Figure 2B:
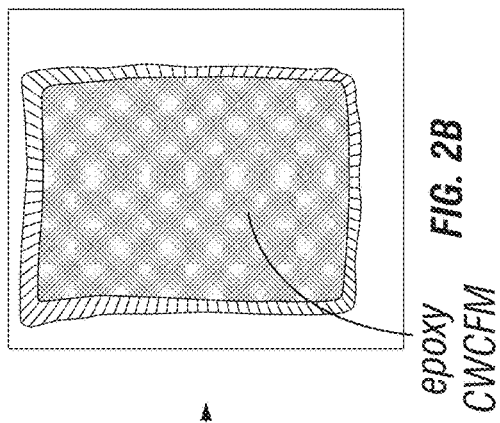
Figure 2E:
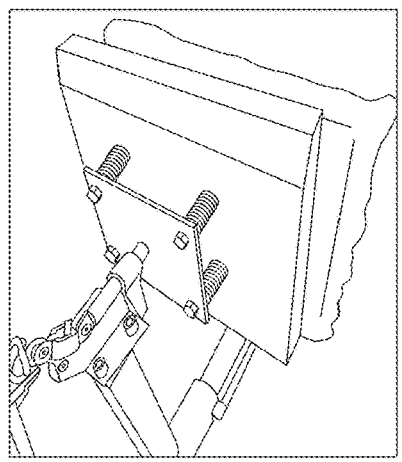
Figure 2A:
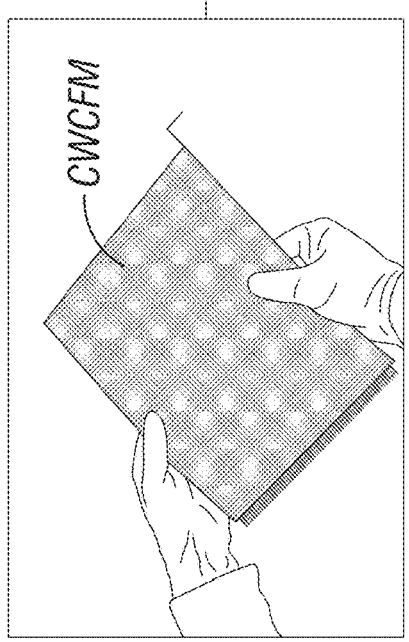

Assembly of an all-solid-state ASC directly on the epoxy-coated CWCFM: First, two glass plates (exemplary dimensions of 6 in.×6 in.) were buffed with a Partall paste wax #2 or another suitable gloss mold release wax. This was followed by spray coating of a PVA release film #13 from Fibreglast or other suitable chemical release agent on the wax buffed surface. The film-coated glass plates were left for drying (for example 30 minutes). Meanwhile, industrial-grade "West system 105 epoxy-resin" and "207 special clear hardener" were optimally mixed in a ratio of 1:3 and stirred gently for 20 minutes to ensure proper mixing and low formation of microbubbles. This solution had an approximate curing time of 40 minutes. Further, the prepared epoxy solution was uniformly coated (single coat) on the two glass plates and an epoxy-coated CWCFM mat was gently placed on top of it (FIGS. 2A and 2B). The cathode deposited carbon fiber electrode was coated with standard 1 M Na$_2$SO$_4$-PAM gel electrolyte and placed on the CWCFM. The epoxy is compatible with the synthesized PAM gel electrolyte and does not affect its performance even in any accidental mixing. A glass fiber (2 Oz, 241-A series bought from Fibreglast) layer was used as a separator. Further electrolyte coated anode (made from carbon fiber mat) was placed in the inverted position, with the active material deposited area overlapping with that of the cathode completing the device assembly. FIG. 2C shows the midway assembly of the ASC prototype composite blank.

Encapsulation and multilayer additions (FIG. 2D): After assembling the asymmetric device directly on the epoxy-coated CWCFM, another epoxy-coated CWCFM was placed gently on the anode layer hence completing the fabrication of one-device layer. Similarly, multiple layers could be stacked over each other and even a rotation of 45° in XY plane could be introduced at each device layer to achieve more uniform directional strength in the XY plane. These independent device layers could be connected in series. A total of 10 fiber mat makes up a thickness of 3 mm.

Figure 2F:
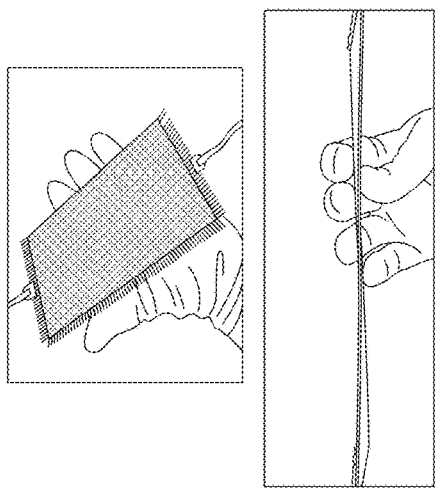

Hot-press application and overnight curing to make ECB (FIG. 2E): Once the desired thickness of the uncured blank was achieved, it was hot-pressed using HSINCHU hot press. The hot-press temperature was set to 85° C. and cooling temperature as 30° C. at a pressure of 50 kg/m$^2$. This pressing technique is most common for making carbon-fiber-reinforced thermoplastics. A final ECB composite is shown in FIG. 2F.

Materials and Structural Characterization

VGCF/Mn$_3$O$_4$ Electrode

Figure 3A:
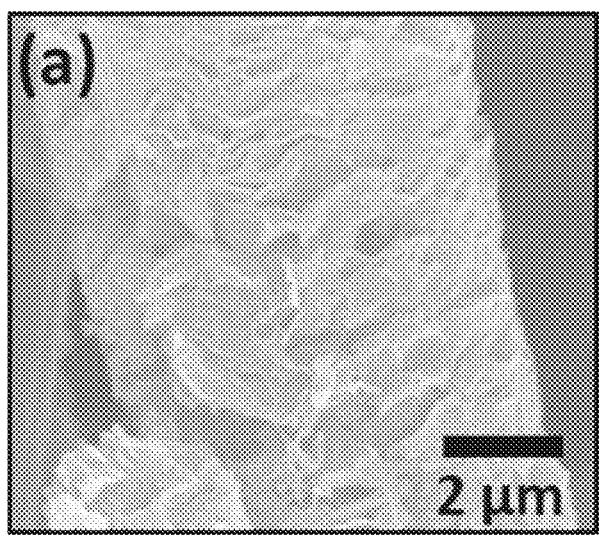
Figure 3B:
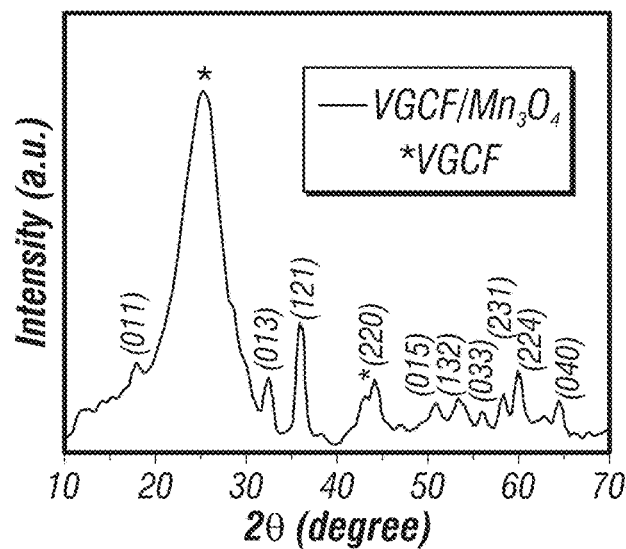
Figure 3C:
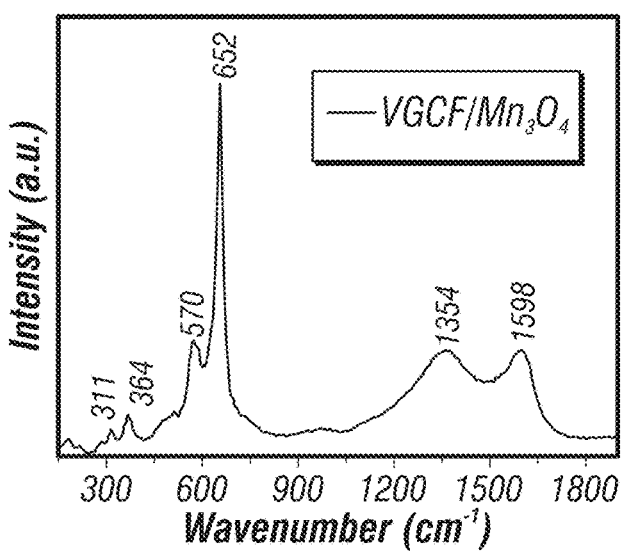

The vertically attached graphene nanosheets on the carbon fiber (VGCF), as shown in FIG. 3A, offer 3D nanoporous architecture and enhanced surface area, which synergistically helps faster ion movement and store more charges on the electrode surface. The electrical conductivity of the graphene nanosheets offers faster electron transport, thereby improving the charge-discharge ability of the electrode. The XRD peaks recorded for the VGCF/Mn$_3$O$_4$ electrode prepared via hydrothermal process (FIG. 3B) shows the growth of tetragonal hausmannite Mn$_3$O$_4$ (ICSD: 77478) on graphene nanosheets with characteristic 2θ peaks seen at 18°, 32.4°, 36.1°, 44.5°, 50.9°, 53.9°, 56.1°, 58.5°, 60°, and 64.7° corresponding to (011), (013), (121), (220), (015), (132), (033), (231), (224), and (040) crystal planes, respectively. The presence of graphene in the VGCF/Mn$_3$O$_4$ electrode is confirmed by its characteristic peaks observed at 25.4° and 43.4°. The Raman spectrum of the VGCF/Mn$_3$O$_4$ electrode (FIG. 3C) reveals the presence of both graphene nanosheets and Mn$_3$O$_4$. The presence of the characteristic D and G bands at 1354 and 1598 cm$^{-1}$, respectively, confirms vertically attached graphene nanosheets on carbon fibers. The small peaks at 311 cm$^{-1}$, 364 cm$^{-1}$ and a dominant peak at 652 cm$^{-1}$ are attributed to Mn—O symmetric stretching of the tetragonal Mn$_3$O$_4$ deposited on graphene, which correlates well with the XRD data. Furthermore, a moderate peak at 570 cm$^{-1}$ is due to the presence of a small amount of MnO$_2$ in the electrode material.

The SEM image of the VGCF/Mn$_3$O$_4$ electrode (FIG. 3D) shows that the manganese oxide is grown uniformly over the VGCF structure like nanoflowers made of ultrathin nanowalls and nanowires with diameters of approximately 10-20 nm and several micrometers in length. The uniform coverage of the active material over the VGCF template is vital for uniform and equal current distribution. Developing the manganese oxide as nanoflowers and nanowires enables to enhance the charge storage area and shorten the diffusion pathways for ions and electrons. As the VGCF structure retains its vertical attachment after the hydrothermal growth process of Mn$_3$O$_4$, the porous channels offered by them are maintained for faster ion diffusion (FIG. 3E). The nanoflowers and 3D nanowires network architecture formed by the $Mn_3O_4$ over the 3D VGCF (FIG. 3F) aids in tackling the typical resistivity issues encountered by pristine manganese oxide electrodes. This is evident from the low charge transfer resistance observed in the VGCF/$Mn_3O_4$ electrode. The HR-TEM image of the VGCF/$Mn_3O_4$ electrode (FIGS. 3G and 3H) displays ultra-thin graphene nanosheets covered with numerous interconnected $Mn_3O_4$ nanosheets and nanowires. The EDAX performed for the VGCF/$Mn_3O_4$ electrode displays a uniform distribution of elements (Mn, O and C) all over the electrode surface (FIG. 3I), showing that the manganese oxide is evenly coated over VGCF.

VGCF/$MoO_2$ Electrode

Figure 4A:
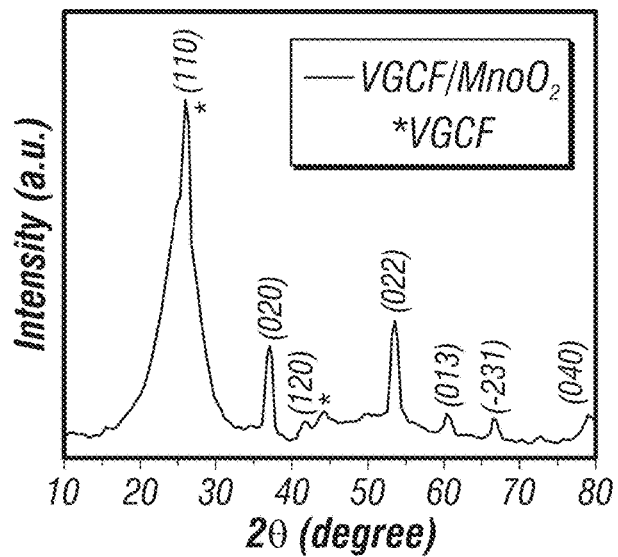
FIGS. 4A-4F show material and structural characterization of the VGCF/$MoO_2$ electrode as follows: XRD (FIG. 4A) and Raman (FIG. 4B) measurement of monoclinic VGCF/$MoO_2$ electrode; EDAX images of the VGCF/$MoO_2$ electrode showing the uniform distribution of the elements Mo, O and C (FIG. 4C); SEM images (FIG. 4D) depiction of the uniform coverage of the VGCF/$MoO_2$ material on carbon fibers with (FIG. 4E) box region showing the presence of both VGCF nanosheets and $MoO_2$ nanoparticles; and TEM image shows the presence of $MoO_2$ thin sheaths on VGCF electrode (FIG. 4F).
Figure 4B:
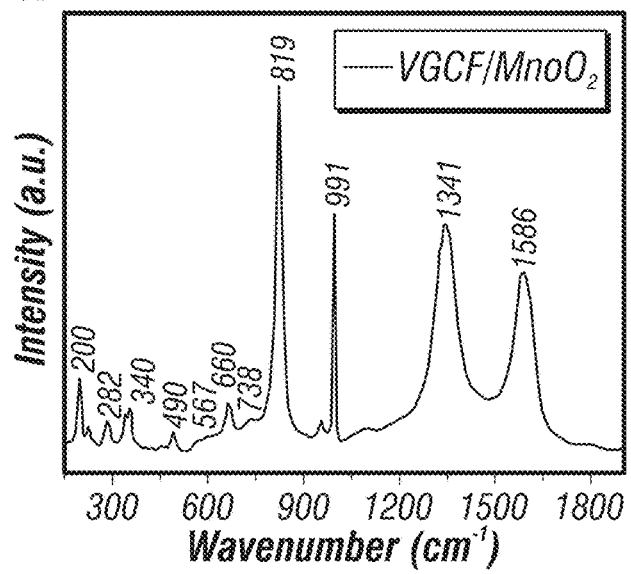

The XRD peaks of the VGCF/$MoO_2$ electrode (FIG. 4A) revealed that the crystal structure formed is monoclinic $MoO_2$ (ICSD: 108875) with characteristic $2\theta$ peaks seen at 25.8°, 36.9°, 41.6°, 53.5°, 60.5°, 66.7° and 78.8° corresponding to (110), (020), (120), (022), (013), (−231) and (040) crystal planes, respectively. The existence of graphene in the VGCF/$MoO_2$ electrode is confirmed by its characteristic peaks observed at 25.8° and 44°. The Raman spectrum of the VGCF/$MoO_2$ electrode (FIG. 4B) reveals the presence of both graphene nanosheets and $MoO_2$. The presence of the characteristic D and G bands at 1341 and 1586 $cm^{-1}$, respectively, confirms the presence of vertically aligned graphene nanosheets on carbon fibers. Additionally, the presence of monoclinic $MoO_2$ is confirmed by the presence of characteristic bands at 567, 738, 819 and 991 $cm^{-1}$ corresponding to O—Mo bond vibration modes. The other bands seen at 200, 282, 340, 490, and 660 $cm^{-1}$ correspond to the phonon vibration modes of $MoO_2$.

Figure 4C:
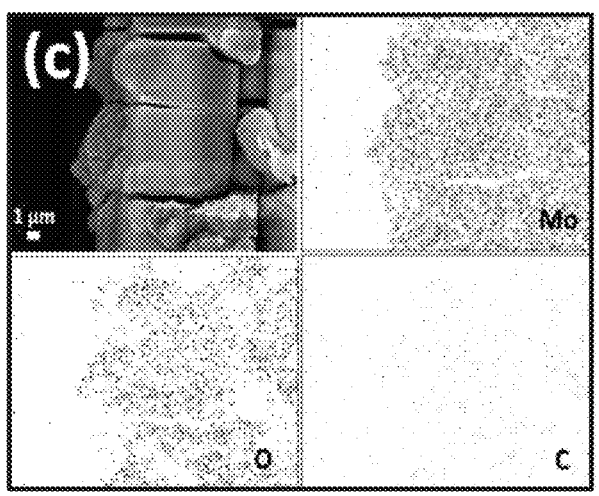
Figure 4F:
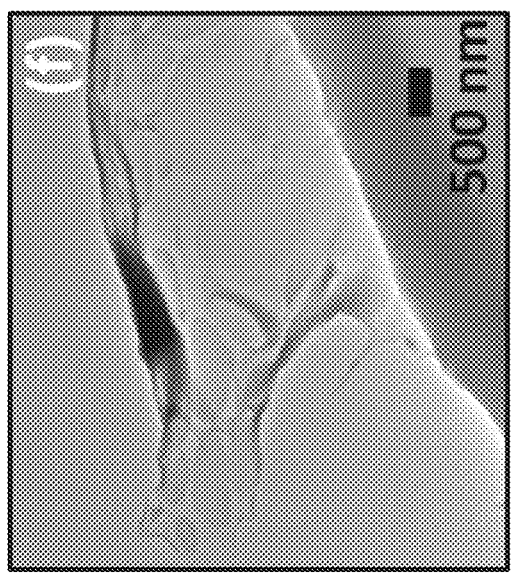
Figure 4E:
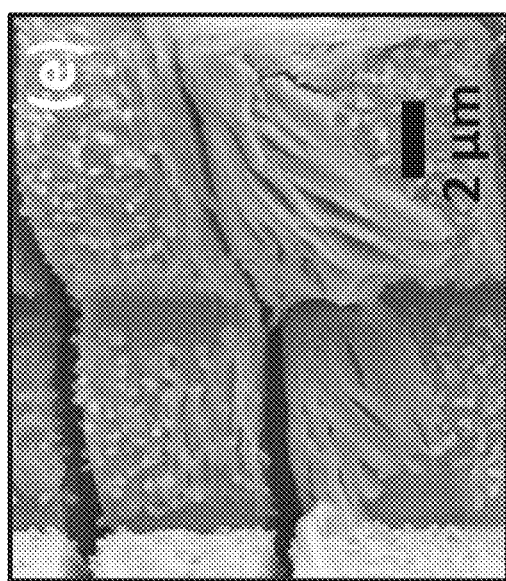
Figure 4D:
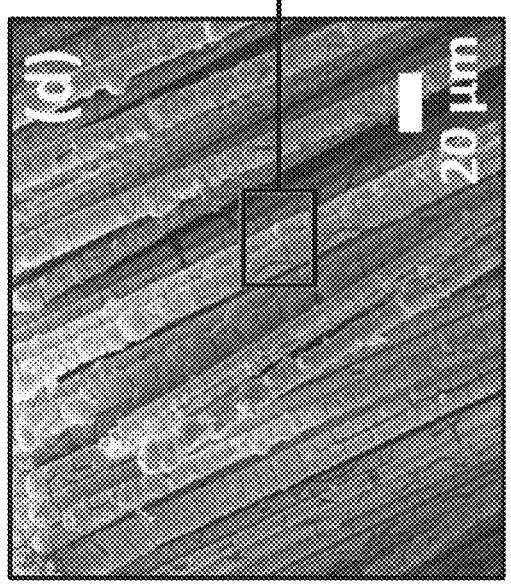

Electrodeposition of $MoO_2$ on VGCF yielded a core/shell structure with uniform distribution of elements (Mo, and O) all over the VGCF structure (FIG. 4C). Numerous $MoO_2$ nanoparticles formed a continuous sheath covering the graphene nanosheets to form the VGCF/$MoO_2$ electrode (FIG. 4D). The direct contact achieved between the $MoO_2$ nanoparticles and graphene nanosheets drastically improves the charge transfer efficiency. The SEM image (FIG. 4E) shows that the graphene alignment is still intact even after $MoO_2$ deposition, demonstrating the overall structural integrity of the electrode. The structural integrity of the electrode is vital in achieving the higher cycle life required for energy storage devices. The HR-TEM image of the VGCF/$MoO_2$ electrode (FIG. 4F) further shows that the $MoO_2$ is deposited as thin sheaths on the ultrathin graphene sheets. Thus, the close contact of thin $MoO_2$ and graphene nanosheets helps in achieving a faster charging rate.

Electrochemical Characterization

VGCF/$Mn_3O_4$ Electrode

Figure 5B:
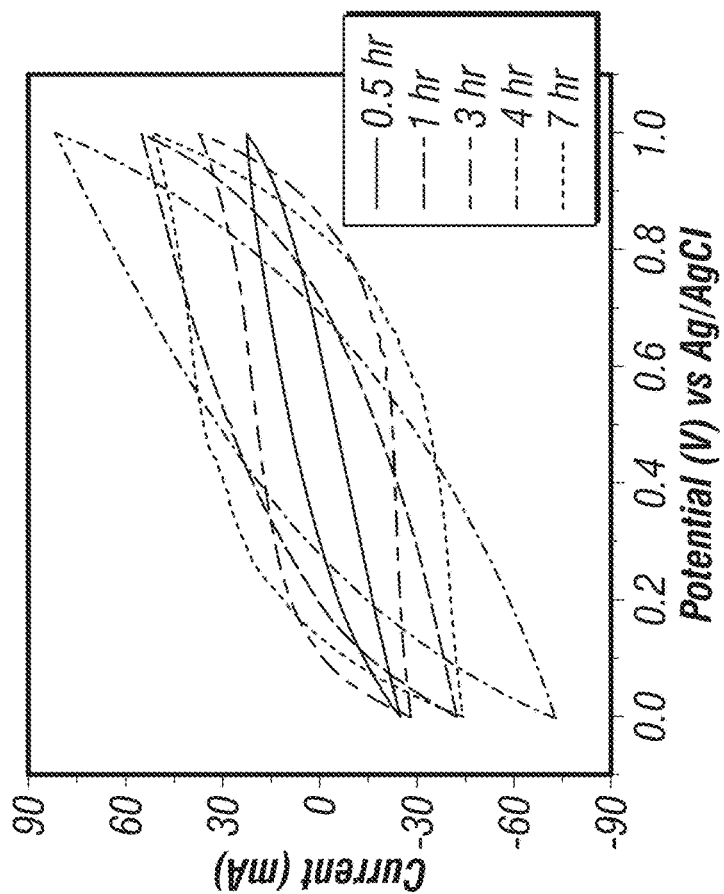
Figure 5A:
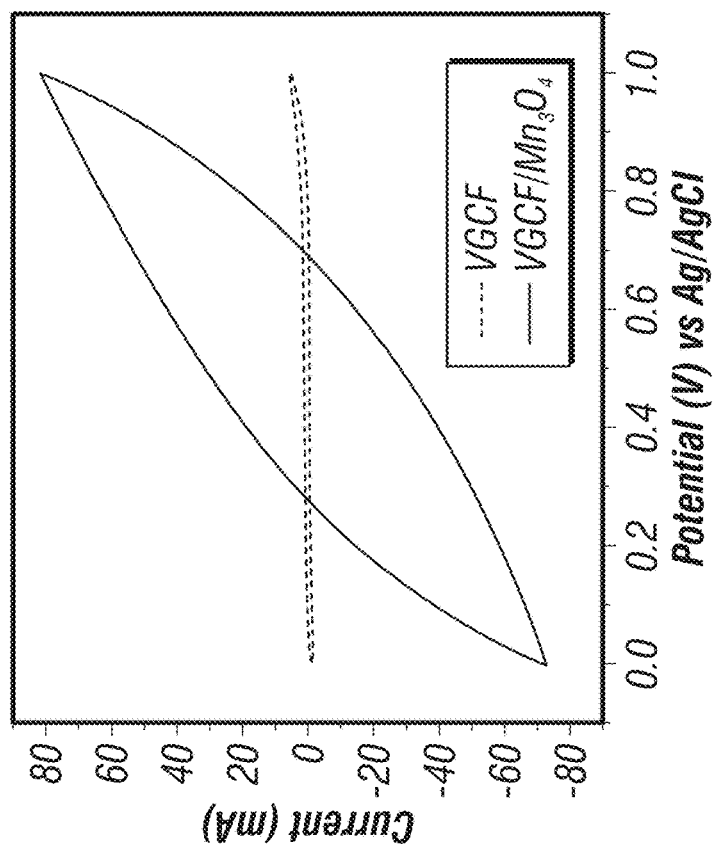
Figure 5D:
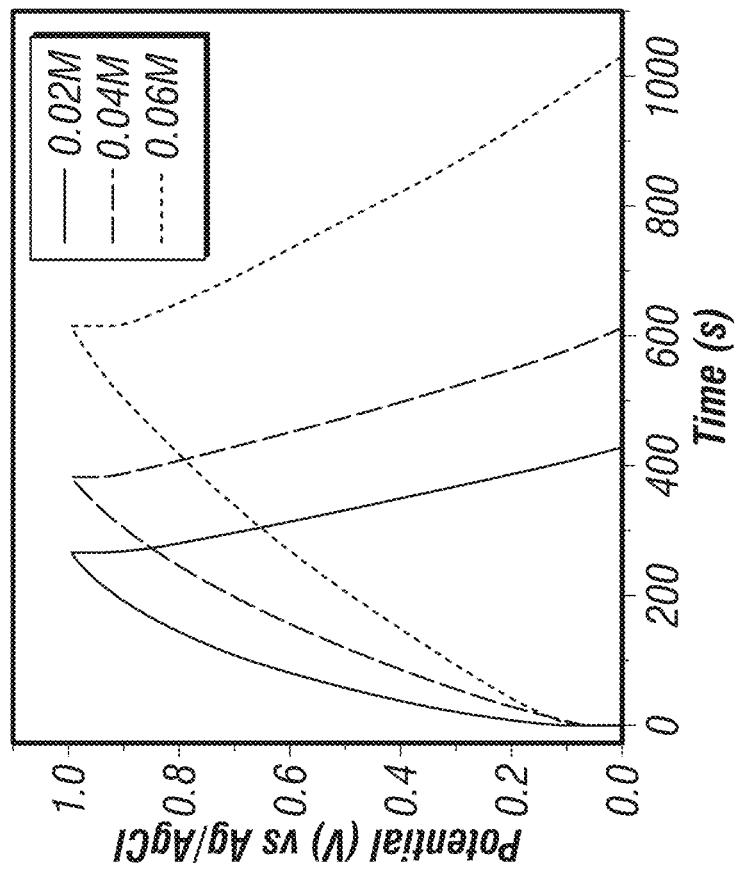
Figure 5C:
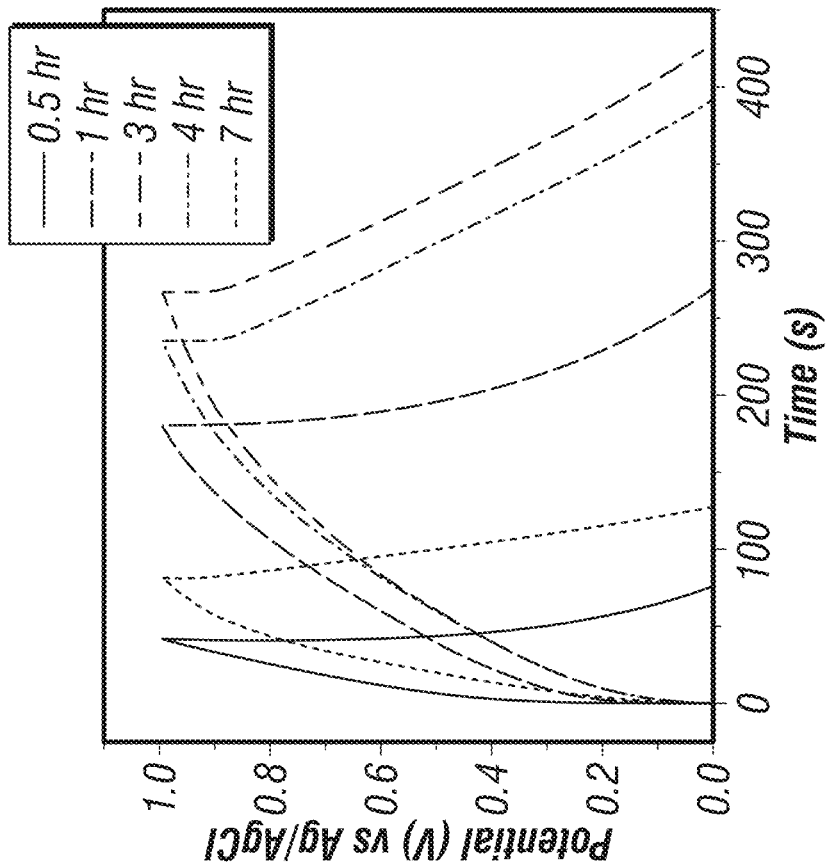

The VGCF electrode tested from 0 to 1.0 V vs Ag/AgCl electrode in 1.0 M $Na_2SO_4$ electrolyte displayed EDLC charge storage behavior. An areal capacitance of 22.13 mF $cm^{-2}$ is delivered by the VGCF electrode at a scan rate of 100 mV $s^{-1}$ (FIG. 5A). The 3D porous architecture can be used as a template for depositing other high capacitance electrode materials. We chose to deposit $Mn_3O_4$ and $MoO_2$ on the VGCF structure with the aim of developing a high voltage and high energy density asymmetric supercapacitor (ASC). The electrochemical performance of the VGCF/$Mn_3O_4$ electrode is measured at a potential range from 0-1.0 V vs Ag/AgCl electrode, as shown in FIG. 5A. The VGCF/$Mn_3O_4$ electrode exhibited a huge increase in areal capacitance of 351.21 mF $cm^{-2}$ (~16 times higher compared to VGCF) at a scan rate of 100 mV $s^{-1}$. This enhancement is due to the combined energy storage performance offered by the electrode from the EDLC and redox charge storage mechanism. Various hydrothermal deposition times ranging from 0.5 hours to 7 hours (FIGS. 5B and 5C) and various molar concentrations of the precursor solution ranging from 0.02 M to 0.06 M (FIG. 5D) are followed for the $Mn_3O_4$ deposition at a temperature of 150° C. It is found that the ideal experimental conditions for synthesizing the best performing VGCF/$Mn_3O_4$ electrode exhibiting high areal capacitance and good charge-discharge ability are using 0.06 M of precursor solution for 4 hours deposition at 150° C.

Figure 6B:
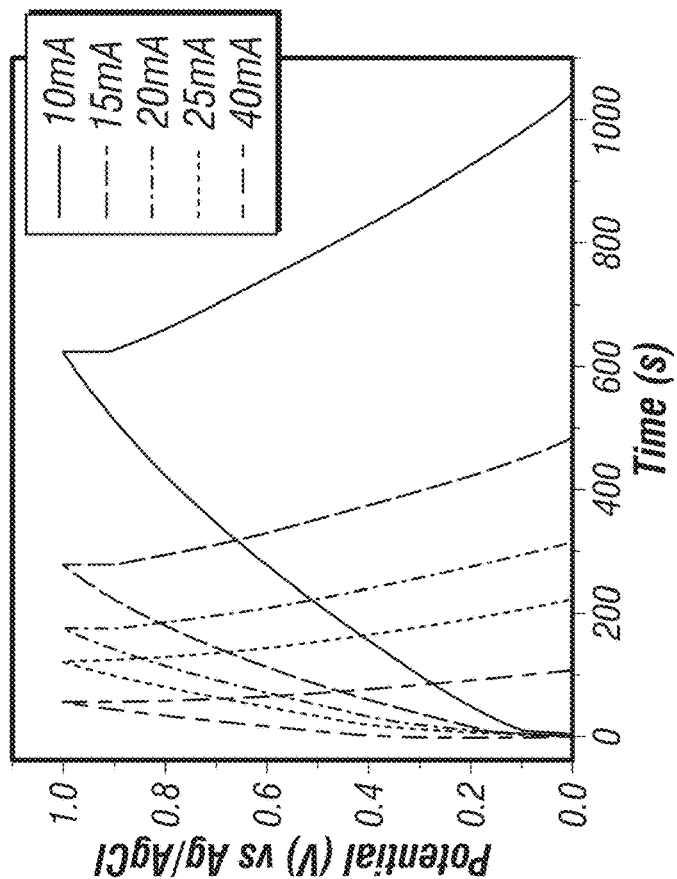
FIGS. 6A-6C show electrochemical performance of the VGCF/$Mn_3O_4$ electrode as follows: CV profile recorded at scan rates from 5 to 50 mV s-1 (FIG. 6A); GCD profile recorded at current from 10 mA to 40 mA (FIG. 6B); and Nyquist plot recorded from 1 MHz to 1 mHz with inset showing a magnified portion of the high-frequency region (FIG. 6C).
Figure 6A:
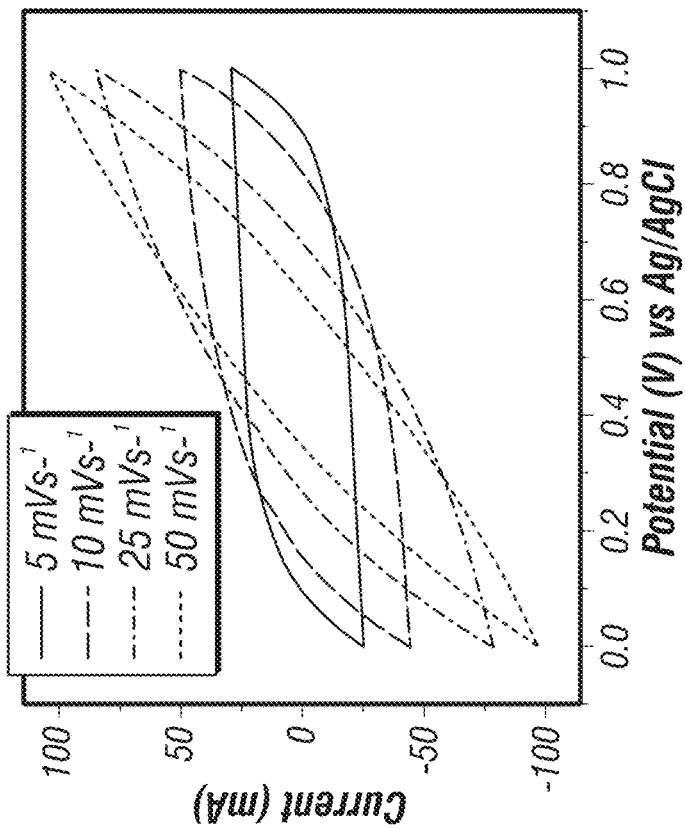
Figure 6D:
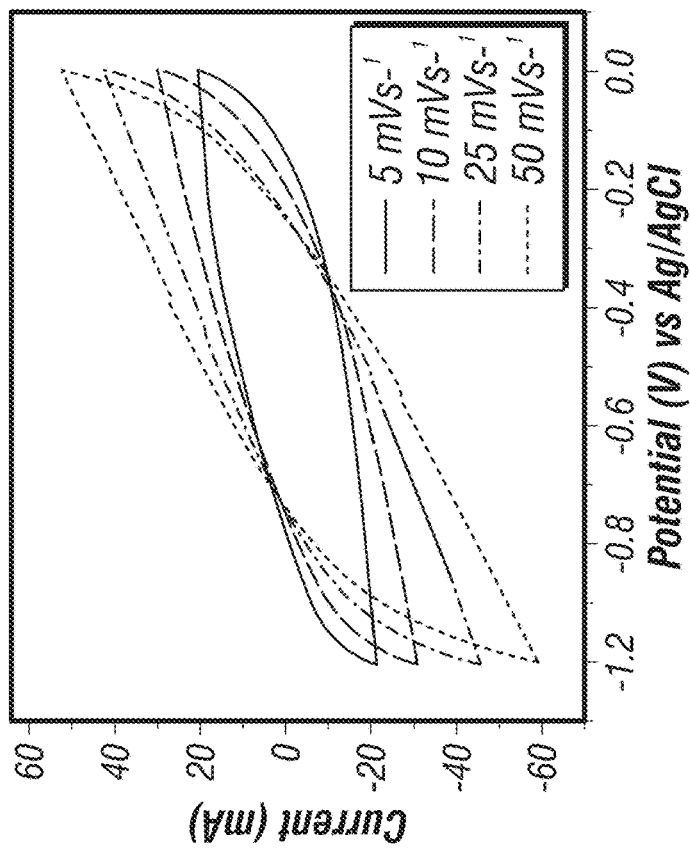
FIGS. 6D-F show electrochemical characterization of the VGCF/$MoO_2$ electrode as follows: CV profile recorded at scan rates from 5 to 50 mV s-1 (FIG. 6D); GCD profile recorded at current from 10 mA to 40 mA (FIG. 6E); and Nyquist plot recorded from 1 MHz to 1 mHz with inset showing a magnified portion of the high-frequency region (FIG. 6F).
Figure 6C:
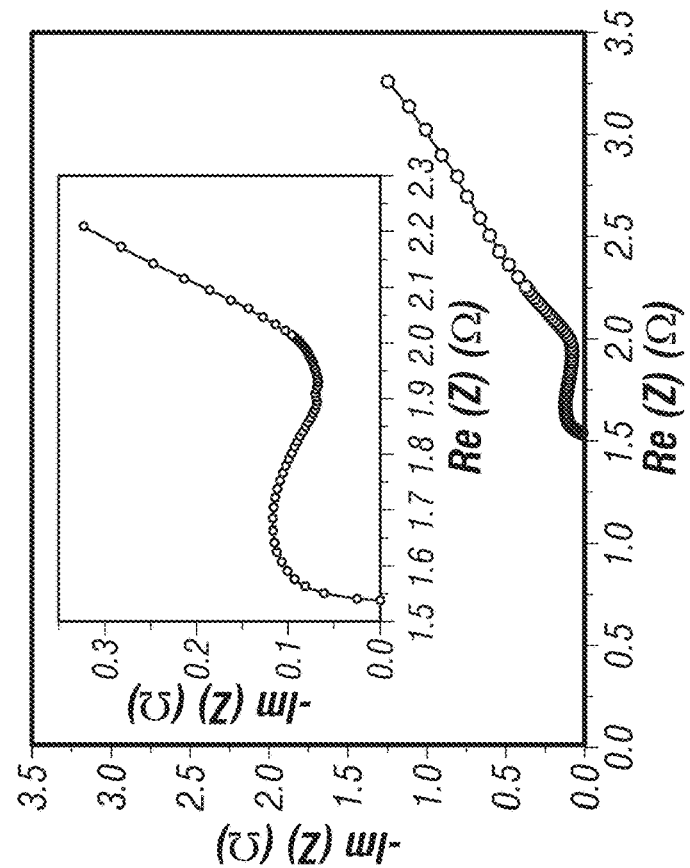

CV curves of the VGCF/$Mn_3O_4$ electrode were measured at various scan rates from 5 to 50 mV $s^{-1}$ as shown in FIG. 6A. The VGCF/$Mn_3O_4$ electrode exhibited a high areal capacitance of 1.93 F $cm^{-2}$ at a scan rate of 5 mV $s^{-1}$. As the electrolyte ions are accessible to nearly all the electrode surfaces at low scan rates, a rectangular CV profile is formed, indicating an ideal capacitive behavior. But with the increasing scan rates, the curves gradually deviated from the original near rectangular shape due to the less time available for the ion diffusion. The GCD profile of the VGCF/$Mn_3O_4$ electrode was measured at various current densities ranging from 10 mA to 40 mA $cm^{-2}$ as shown in FIG. 6B. The electrode showed an ideal capacitive behavior with linear and symmetrical GCD curves at lower current density. The electrode exhibited an areal capacitance of 1.1 F $cm^{-2}$ at a current density of 10 mA $cm^{-2}$ and maintained more than 0.51 F $cm^{-2}$ even at a higher current density of 40 mA $cm^{-2}$. The Nyquist plot (FIG. 6C) recorded at a high-frequency region for the VGCF/$Mn_3O_4$ electrode displayed a very small semicircle corresponding to the small charge transfer resistance ($R_{ct}$) of 0.40Ω and an equivalent series resistance (ESR) of 1.54Ω facilitating better diffusion and transport of the electrolyte ions. Such low resistance is significant in attaining improved rate capability and faster charge storage ability, which is important for charging EVs. At the low-frequency region, the near-vertical line observed is due to the ion diffusion into the electrode displaying the lower diffusion resistance and good capacitive behavior of the electrode.

VGCF/$MoO_2$ Electrode

Figure 6E:
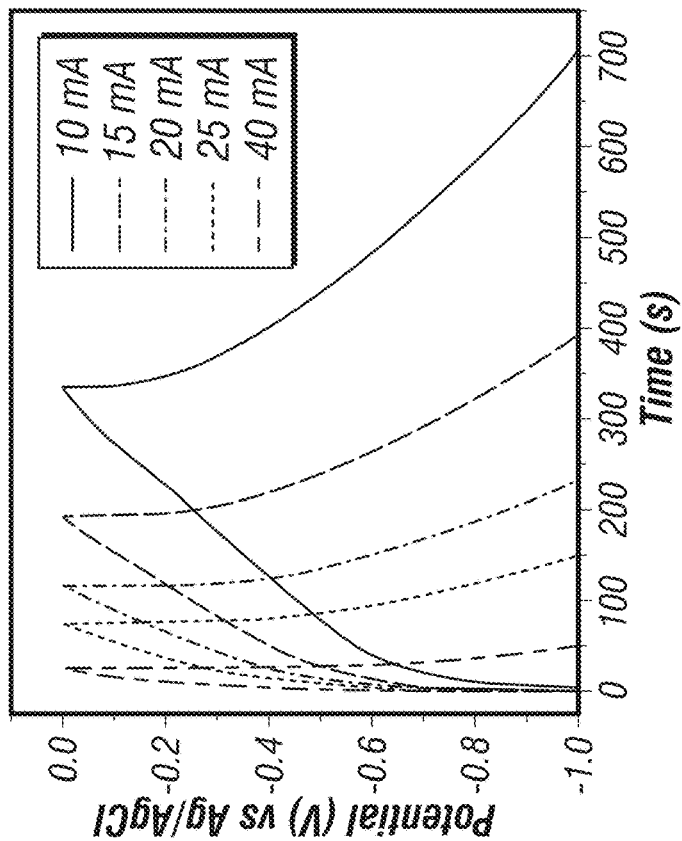
Figure 6F:
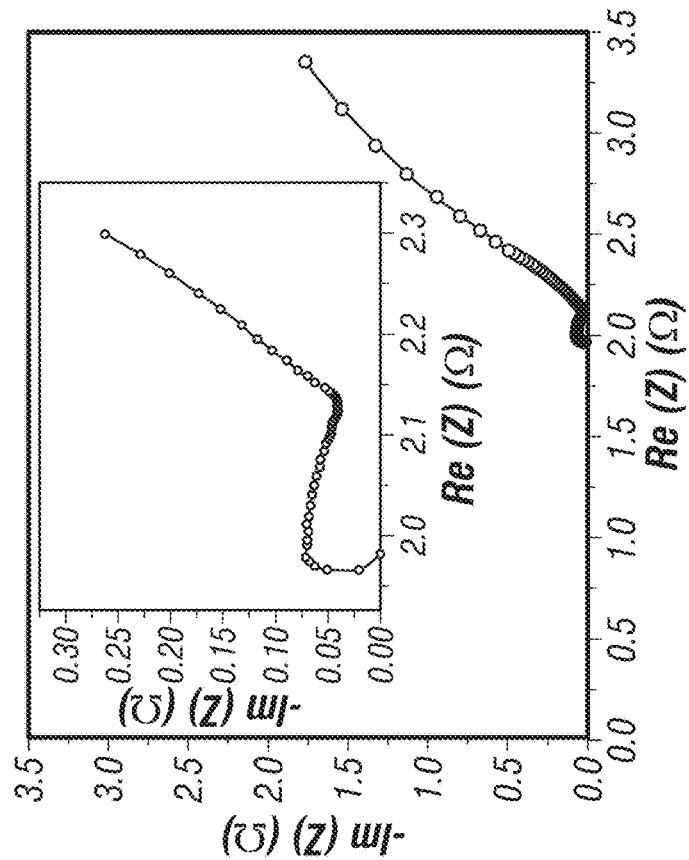

The electrochemical performance of VGCF/$MoO_2$ electrode is measured at a potential range from −1.0 to 0 V vs. Ag/AgCl electrode (FIG. 5E). Various electrochemical deposition times ranging from 10 min to 60 mins are followed for the $MoO_2$ electrode (FIG. 5F). Initially, the capacitance of the VGCF/$MoO_2$ electrode increased with increasing deposition time. But with increasing deposition time, the excessive coating of $MoO_2$ will completely block the porous structure, thereby decreasing the charge transport of the electrode. The ideal conditions for yielding the best performing VGCF/$MoO_2$ electrode with high areal capacitance and good charge-discharge ability are found to be 45 mins. The CV curves of the VGCF/$MoO_2$ electrode (FIG. 6D) displayed a quasi-rectangular behavior due to the presence of both EDLC and pseudocapacitive charge storage behavior. The VGCF/$MoO_2$ electrode showed an areal capacitance of 1.23 F $cm^{-2}$ at a scan rate of 5 mV $s^{-1}$. The high areal capacitance obtained is due to the synergetic effect of the 3D VGCF improving electrical conductivity and $MoO_2$ offering high capacitance through faradaic charge storage. With the increase in scan rate, the electrode maintained its shape without any deformation displaying the low resistance offered by the electrode. The VGCF/$MoO_2$ electrode (FIG. 6E) recorded at different current densities ranging from 10 mA to 40 mA $cm^{-2}$ revealed a nonlinear profile that showed faradaic charge storage behavior. Moreover, the electrode showed no obvious voltage drop as proof of low resistance offered. The electrode exhibited an areal capacitance of 0.94 F cm$^{-2}$ at a current density of 10 mA cm$^{-2}$ and maintained up to 0.30 F cm$^{-2}$ even at a higher current density of 40 mA cm$^{-2}$. Furthermore, the Nyquist plot, (FIG. 6F) recorded at the high-frequency region showed a very small semicircle with R$_{ct}$ of 0.17Ω and an ESR of 1.97Ω. This electrode has very low R$_{ct}$, because, under optimized deposition conditions, uniform deposition of the MoO$_2$ nanoparticles forms a sheath around the 3D VGCF architecture without obstructing the porous structure.

Aqueous Asymmetric System

Figure 7B:
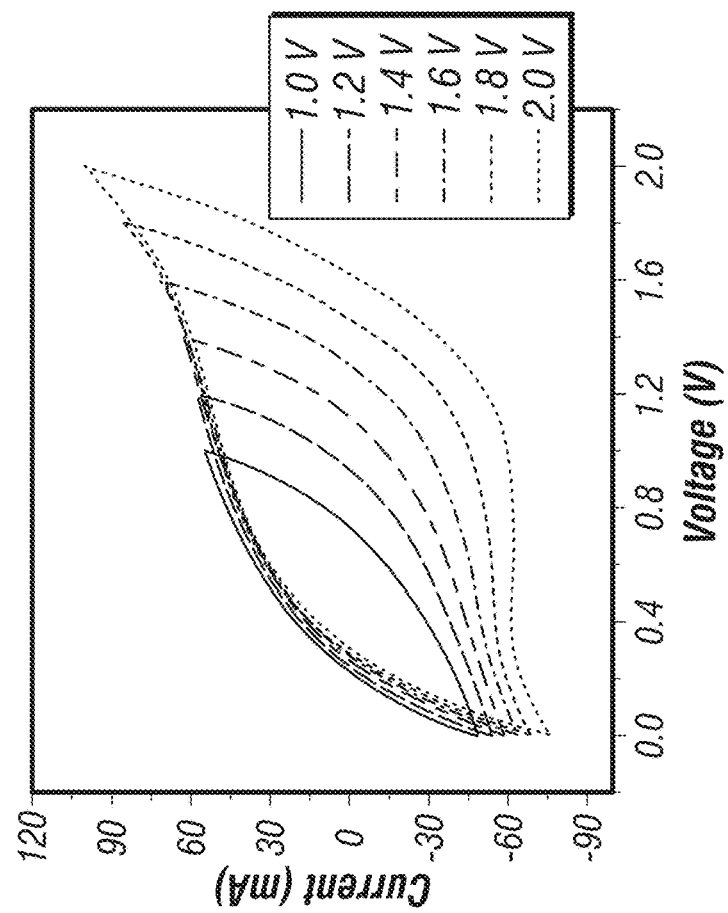
FIG. 7B shows asymmetric cell's voltage is gradually increased to 2.0 V at a scan rate of 100 mV s$^{-1}$.
Figure 7A:
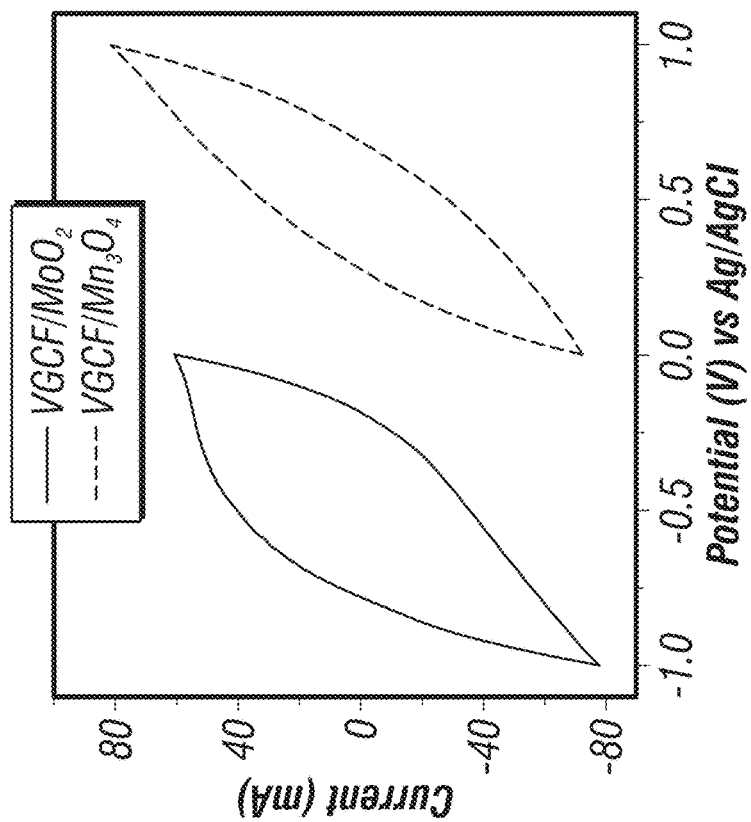
FIG. 7A shows charge balancing study of both the electrodes.

An ASC device was fabricated using VGCF/Mn$_3$O$_4$ as the positive electrode and VGCF/MoO$_2$ as the negative electrode in 1 M Na$_2$SO$_4$ aqueous electrolyte. The area of the active material is adjusted for charge balance as the three-electrode studies displayed a difference in both the electrode's specific capacitance and potential window (FIG. 7A). An ASC device was fabricated with VGCF/Mn$_3$O$_4$/VGCF/MoO$_2$ electrodes after charge balancing and all the electrochemical tests of the ASC were performed from 0 to 2 V in 1 M Na$_2$SO$_4$ electrolyte as there is no evolution observed till 2.0 V (FIG. 7B).

Figure 8F:
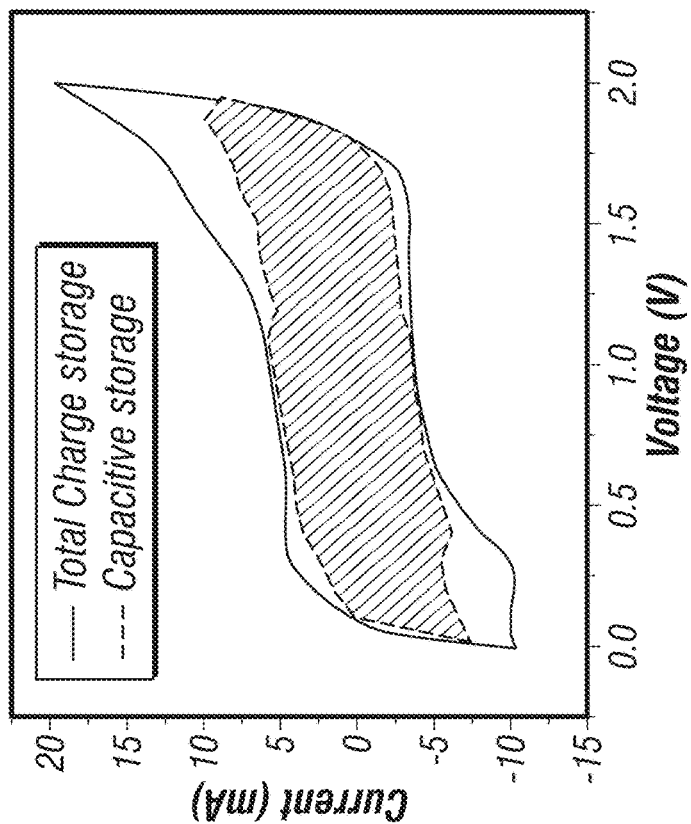

The ASC fabricated with VGCF/Mn$_3$O$_4$/VGCF/MoO$_2$ were tested at various scan rates from 5 to 100 mV s$^{-1}$ in 1 M Na$_2$SO$_4$ aqueous electrolyte (FIG. 8A). The ASC exhibited a high areal capacitance of 0.645 F cm$^{-2}$ at a scan rate of 5 mV s$^{-1}$. They showed an almost rectangular CV profile with redox behavior, demonstrating that the ASC exhibits both faradaic and non-faradaic charge storage. The GCD profile of the ASC was measured at various current densities ranging from 10 mA to 20 mA cm$^{-2}$. The ASC demonstrated a redox behavior as shown in the GCD curve (FIG. 8B). The electrode exhibited an areal capacitance of 0.3 F cm$^{-2}$ at a current density of 10 mA cm$^{-2}$. The ASC's hybrid charge storage behavior will help bridge the energy and power gap between batteries and supercapacitors. The Nyquist plot recorded at a high-frequency region for the ASC cell (FIG. 8C) displayed a very small semicircle corresponding to the charge transfer resistance (R$_{ct}$) of 1Ω and an ESR of 2.70Ω. At the low-frequency region, the near-vertical line observed is due to the ion diffusion into the electrode displaying the lower diffusion resistance and good capacitive behavior of the electrode. The ASC is cycled for 15,000 cycles at a scan rate of 100 mV s$^{-1}$, as shown in FIG. 8D. The ASC showed capacitance retention of ~100% with an initial increase in capacitance and then decreasing to the initial capacitance. The high cycle life can be attributed to the strong graphene attachment to the carbon fibers and the porous channel offered by these electrodes allows for more accessible ion transport without disrupting the nanostructures. Such a high cycle life with no capacitance degradation is crucial for the energy storage devices which power the EVs as they cannot be replaced if used as the body panel. The inset of FIG. 8D shows that the area and shape of the CV curve remain almost the same for the ASC cell recorded at 1$^{st}$ cycle and at the end of 15,000 cycles depicting the charge storing stability of the fabricated ASC system.

Helping to significantly enhance the energy density, this asymmetric configuration of VGCF/Mn$_3$O$_4$/VGCF/MoO$_2$ not only stores the charges through a capacitive mechanism but also exhibits battery-type charge storage through solid-state ion diffusion. To identify and estimate quantitatively the contribution of capacitive type charge storage and storage by solid-state ion diffusion, a calculation method by Lindstrom et al. (H. Lindstrom, S. Sodergren, A. Solbrand, H. Rensmo, J. Hjelm, A. Hagfeldt, S. E. Lindquist, J Phys Chem B 1997, 101, 7717) was applied. As shown in FIG. 8A, the CV analysis was performed at different scan rates of 5, 10, 25, 50, 100 mV s$^{-1}$. Using these scan rates Cottrell's equation was established and the b value was estimated. The details of the estimation are given below and in FIG. 9A.

Figure 8E:
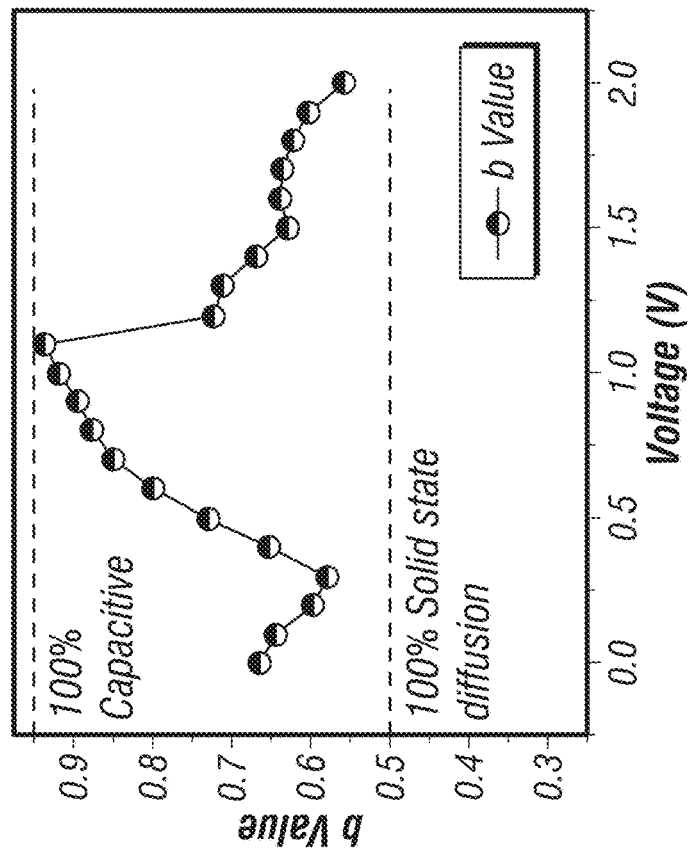

Further, to understand the nature of charge storage (depending on the operational voltage), a curve was plotted with b value vs. V. This is given in FIG. 8E, which clearly shows that the b value varies between 0.5 (100% solid-state ion diffusion) and 1.0 (100% capacitive charge storage). This indicates that there is battery-type diffusion-based charge storage along with capacitive charge storage. The b value tends to approach 0.5, at a voltage of 0.275 V and in the range of 1.5 V to 2.0 V. This suggests that near the potential of 0.275 V and in the range of 1.5 V to 2.0 V, the assembled device tends to store more charge through solid-state ion diffusion than the capacitive mechanism. In contrast, at other ranges of voltage, the charge storage is dominantly capacitive. This was also evident by the peaks around 0.275 V and 1.5V to 2.0 V region in the low scan rate (5 mV s$^{-1}$) CV, as shown in FIG. 10. In order to quantitatively determine the percent contribution of capacitive charge storage and charge storage by solid-state ion diffusion, a low scan rate CV of 5 mV s$^{-1}$ was chosen and the k values were determined as shown below and in FIG. 9B. Once k$_1$ and k$_2$ are known, the independent contributions of capacitive current (k$_1$v) and solid-state ion diffusion current (k$_2$v$^{1/2}$) were determined. Finally, the capacitive contribution was plotted as a shaded region (FIG. 8F) inside the CV of 5 mV s$^{-1}$. Quantitatively, 70% of the charge storage came from the capacitive mechanism and 30% of the charge storage was achieved through a battery-type solid-state ion diffusion mechanism.

Asymmetric Energized Composite Blank (Solid-State Device)

The asymmetric energized composite blank was developed with the VGCF/Mn$_3$O$_4$/VGCF/MoO$_2$ ASC configuration using a 1 M Na$_2$SO$_4$/PAM gel electrolyte. A flat piece of sheet metal in the metal processing industry, just before making any specific shape, is called a blank. The developed asymmetric energized composite supercapacitor is tested at various scan rates from 5 to 100 mV s$^{-1}$ (FIG. 11A). The ASC cell exhibited a high areal capacitance of 559 mF cm$^{-2}$ at a scan rate of 5 mV s$^{-1}$ and maintained 252.4 mF cm$^{-2}$ at a scan rate of 100 mV s$^{-1}$. The ASC device exhibits only near-rectangular CV profile with redox behavior, showing both types of charge storage exist in the cell. The performance of the energized composite is closer to the ASC cell tested in the aqueous 1 M Na$_2$SO$_4$ electrolyte. This is due to the efficient transport pathway provided for the aqueous-PAM gel electrolyte. Thus, the energized composite with the gel electrolyte can simultaneously negate the risk of fire and maximize energy storage, unlike the other solid gel electrolytes typically used in supercapacitors.

The gravimetric specific capacitance of the energized composite was found to be 74.5 F g$^{-1}$ at a scan rate of 5 mV s$^{-1}$. A high energy density of 41.4 Wh Kg$^{-1}$ at a power density of 394 W Kg$^{-1}$ and high power density of 3.8 kW Kg$^{-1}$ at energy density of 19 Wh Kg$^{-1}$ was delivered by the energized composite. As the core application of the energized composite is replacing the existing car body panels constituting 10 m$^2$ area, the significance should be given more to the areal energy density. The energized composite can deliver a high areal energy density of 0.31 mWh cm$^{-2}$ at a bare minimum thickness of 0.3 mm. 10 layers of such devices (in series/parallel) stacked on top of each other, make up a thickness of 3 mm thick composite. Thus, covering the overall area of the car with the energized composite would provide additional range which would be supporting the existing batteries.

The GCD profile of the energized composite was measured at various current densities ranging from 40 mA to 80 mA cm$^{-2}$ (FIG. 11B). The device showed good charge-discharge behavior maintaining a good coulombic efficiency and rate capability at higher current densities. This shows the potential of the energized composites in high-power applications. The Nyquist plot (FIG. 11C) displayed a very small semicircle corresponding to the charge transfer resistance ($R_{ct}$) of 1Ω and an ESR of 2.10Ω at a high-frequency region. At the low-frequency region, the near-vertical line observed is due to the ion diffusion into the electrode displaying the lower diffusion resistance and good capacitive behavior of the electrode. The ASC cell is cycled for 8,500 cycles at a scan rate of 100 mV s$^{-1}$ (FIG. 11D). It showed a capacitance retention of ~90%, with an initial increase in capacitance due to the activation of the electrochemical sites in the electrodes. FIG. 11E compares the CV profile of the energized composite recorded at 1$^{st}$ and 8500$^{th}$ cycle with a slight reduction in the overall area but maintaining its shape. This shows that the energized composite's charge storage ability is still maintained at a higher cycle life. The energized composite blank can power a toy drone propeller, as shown in FIGS. 11F-H, demonstrating its value for real-life applications.

Multilayer Composite Design and its Fabrication

Once the asymmetric device exhibited a superior performance of electrical charge storage in 1 M Na$_2$SO$_4$ electrolyte, it was ready to be developed into an ultrastrong, lightweight, energy-storing carbon fiber reinforced polymer (e-CFRP) composite. To achieve high strength in both longitudinal and transverse directions, the CWCFM was chosen as the current collector (to make the VGCF electrode). Due to the cross-weaving of carbon fibers, a composite made of such a mat would take the load in both longitudinal and transverse directions. A special alternated pattern design was chosen for fabricating this composite. This could be a universal pattern used for any type of fiber-form current collector, electrode material, electrolyte, and separator assembly to form an "electrical energy storage fiber reinforced polymer (FRP)." This design is explained in the following section.

Location Pattern on CWCFM for Cathode & Anode Material Deposition

As shown in FIG. 12A, the CWCFM was allotted multiple 2 cm×2 cm square patches for cathode and anode material deposition. To achieve this patterned deposition, appropriate masks were used. These square patches had a 1 cm gap between them on each side for the infusion of epoxy resin. This helped to provide mechanical strength to the composite. Further mechanical strength is greatly enhanced by alternating the layers between odd location patterns (1,3, 5 . . . ) and even location patterns (2,4,6 . . . ). The left-out space is used for the application of epoxy resin, shown in FIG. 12B.

FIG. 12A shows cathode material patch deposition at odd (1,3,5, . . . ) locations. Similar patch deposition of anode material (1,3,5, . . . ) was made on the complementary CWCFM. This helped to align anode and cathode material on top of each other. However, there is a separator layer between the anode and cathode layer with an identical pattern of PAM gel electrolyte coated on both sides.

Separator and Insulation

For the purpose of a separator between anode and cathode and electrical insulation of one device from the other, a cross-weaved glass fiber mat was used. The glass fibers mat provided additional mechanical strength. This is shown by a layout of a series stacking of n-number of devices in FIG. 12B. GFi$_n$ represents a glass fiber mat used for the insulation of n$^{th}$ layers. GFs$_n$ represents a glass fiber mat used as a separator between the anode and cathode of the n$^{th}$ device. The GFs used the same location-based pattern of PAM gel electrolyte (2 cm×2 cm) at odd or even locations, mimicking that of anode/cathode mat. The remaining areas on the GFs were applied with binding epoxy to form the bond with its adjacent CWCFMs. Epoxy was applied on the overall surface of the GFi (both sides) to promote bonding between layers of adjacent devices.

Stacking Sequence

Anode and cathode active material were deposited on different CWCFMs in both types of configurations (1,3, 5, . . . ) & (2,4,6, . . . ). FIG. 12B shows:

Cathode deposited CWCFM layer as C$_n$ having (1,3, 5, . . . ) pattern,

Anode deposited CWCFM layer as A$_n$ having (1,3,5, . . . ) pattern, and

Glass fiber as a separator with PAM gel electrolyte (1,3, 5, . . . ) pattern.

Sandwiching these three layers and applying epoxy resin in the leftover spaces fabricated one large area device D$_n$. This large area device D$_n$ was insulated by an epoxy coated GFi$_n$ and GFi$_{(n-1)}$ on both sides. To fabricate the next large area device D$_n$+1, cathode CWCFM (C$_{n+1}$) and anode CWCFM (A$_{n+1}$) with an even location pattern (2,4,6, . . . ) were chosen for the deposition of cathode and anode active material. Similarly, GFs$_{n+1}$ would have PAM gel electrolyte in (2,4,6, . . . ) location pattern. Sandwiching these three layers together and applying epoxy resin in the leftover spaces fabricated the other large area device D$_{n+1}$. This alternate stacking of devices with (1,3,5 . . . ) and (2,4, 6, . . . ) configuration helped a) in achieving a higher area for the application of epoxy resin and b) to provide uniformity in the thickness of the composite. A composite with two layers of such devices was fabricated at the laboratory scale. Similarly, several devices could be stacked together, and a series connection can be made between them using, for example, a connected carbon fiber/copper tape, as shown in FIG. 12B. The number of stacked devices would be based on the energy storage requirement, weight, and the required mechanical strength (including stiffness, impact and tensile, etc.).

Mechanical Characterization

To measure the mechanical properties of the e-CFRP, three tests were performed: 1) Tensile test, 2) Flexural test, and 3) Izod impact test. All tests were done based on their relevant ASTM International standards. In order to better understand the values attained from these tests, an identical (in shape and size) commercial-grade CFRP sample from McMaster-Carr (Part #8194K16) was also tested along with the e-CFRP samples. These tests were performed as follows. Hereafter, the commercial-grade CFRP is simply referred to as "CFRP".

Tensile Test

To determine the tensile strength of the e-CFRP composite, a tension test was performed in accordance with ASTM D3039. FIG. 13A shows the stress vs. strain curves obtained. The initial nonlinear behavior could be attributed to the epoxy's plastic deformation, which shares some load with the fiber. However, once the strain goes beyond 1.5%, the curves become very linear. Despite non-epoxy-bonded regions, the e-CFRP sample exhibited an excellent tensile strength, and its curve closely followed the commercial-grade CFRP made with all epoxy bonded fibers. The breaking point analysis of the two samples showed that the commercial CFRP sample had an ultimate tensile strength of 603 MPa, and the e-CFRP sample matched it up to 85% by showing tensile strength of 518 MPa.

It is to note that this is highly significant considering the fact that e-CFRP comprises non-bonding electrode material and gel electrolyte along with carbon fiber and epoxy in its matrix. So, a small dip in the tensile strength could be a trade-off to get a dual function (of energy storage and superior strength) in these composites. To better understand these tensile strengths, a steel grade AISI 1010, which is five times heavier than these composites, shows an ultimate strength of only 380 MPa. The density of AISI 1010 is 7.87 g cc$^{-1}$ and the density of carbon fiber composite (30% epoxy and 70% fiber) is roughly 1.55 g cc$^{-1}$.

The respective young's modulus of commercial CFRP and e-CFRP were also determined by the slope of the linear section of these curves between the strain of 3% to 3.5%, as given in FIG. 14A. The commercial CFRP had a young's modulus of 17.8 GPa, while the e-CFRP showed a young's modulus of 15 GPa, which is again 84.5% that of commercial CFRP. Similarly, stiffness was estimated from the slope of the load vs. extension curve, the linear region between the extension of 4.5 mm to 5.5 mm (shown in FIG. 14B). The e-CFRP showed a longitudinal stiffness of 7075 N/mm, which was about 85.1% of that of commercial CFRP at 8310 N/mm. Overall, the e-CFRP showed an excellent match in tensile strength to that of a commercial grade CFRP.

Flexural Test (Bending Test)

Flexural test, which is commonly referred to as 3-point bend test, is performed to measure the strength of a sample against a bending type load. Depending upon the plastic behavior of the composite and some relevant studies, ASTM D790 was chosen as the appropriate standard to be followed to conduct this test. Flexural strength and flexural stiffness were determined based on the maximum bending load sustained by the sample. Following relations were used to estimate the strength and stiffness.

$$\text{Flexural strength } (\sigma_{fs}) = \frac{3F_{max}l}{2bh^2}$$

$$\text{Bending stiffness } (S) = \frac{F}{\delta}$$

From the results given in FIG. 13B, the e-CFRP sample sustained a maximum bending load of 1228.5 N, exhibiting a maximum deflection of 4.09 mm before breaking. This was a little higher than the commercial-grade CFRP sample, which sustained 1208 N but only exhibited a maximum deflection of 3.48 mm before breaking. Thus e-CFRP showed a very good and comparable bending stiffness of 300.36 N/mm, which is almost the same as that of commercial-grade CFRP at 347.1 N/mm. Similarly, when flexural strength is considered, e-CFRP recorded a flexural strength of 477.75 MPa, which is almost close to 85% of that of commercial-grade CFRP having bending strength of 563.73 MPa. Also, since e-CFRP could sustain a little higher bending load of 1228.5 N before breaking demonstrate that it was a little more pliant than the commercial-grade CFRP. This little difference could be attributed to the use of different epoxy resin or composite fabrication methodologies adopted.

Impact Test

In order to determine the Impact energy absorption capability (also known as work of fracture (WOF)) of the e-CFRP, Izod tests were performed on both samples. Test codes and conditions were selected based on the methodology given in ASTM D256. The un-notched Izod impact energy test results are plotted in the form bar diagrams for both the samples in FIG. 13(c). The test result shows that the e-CFRP sample could absorb 2666.33 J/m of the impact energy, while the commercial CFRP sample could only absorb 2146.67 J/m. Clearly, e-CFRP exhibited a higher impact energy absorption capability which is also expected from the results of the 3-point bend test, where it was evident that e-CFRP is a little more bendable than the commercial CFRP. A very brittle type fracture in the commercial CFRP was observed, while the e-CFRP was still left as broken but single piece due to few intact internal electrode fibers. This ability to bend without breaking under a deflection load may indiciate a superior impact energy absorption capability. This shows that e-CFRP could be very useful to fabricate future electric car body panels, making them lightweight and absorbing much of the impact energy in case of a major crash incident.

Applications

To demonstrate the viability of the energized composite, some larger area multilayer devices were fabricated.

Powering a Prototype Electric Car Using Energized Composite as its Floor Panel

To run/accelerate a prototype car (electric toy car), with the energy stored in these composites, the required current was first estimated, which could help overcome the starting torque. It was found that the toy car's motor required 200 mA of current to overcome the internal friction of the wheels and the motor. Based on the performance of the 2 cm×2 cm electrode devices, the composites delivered the best performance at 40 mA (each device). This meant that to deliver 200 mA current, five devices need to be connected in parallel. Also, to ramp up the voltage, another set of 5 devices (in parallel) fabricated as a separate layer were connected to the five devices (in parallel) in the first layer via the series connection. All these series and parallel connections were taken using copper tape with moderately conductive glue. This composite is used to power the toy car. FIG. 13D shows the toy car floor, fabricated in the form of a multilayer energized composite. FIG. 13E shows the CV curve of the fabricated multilayer composite at 100 mV s$^{-1}$ scan rate between the voltage range of 0 to 4 V. FIG. 13F shows the multilayer composite floor of the prototype electric toy car and the car runs using the power stored in the energized composite. The whole toy car shown here is made up of the CFRP composite. In practical applications, the car body panels with a total area of 10 m$^2$, including roof, door and trunk lid, can be replaced with e-CFRP composite. Thus, energy can be stored in almost all parts of the vehicle, thereby increasing the vehicle range.

Integrating with a Commercial Solar Cell and Powering an Tot Device: for Cubesats Application While fabricating these supercapacitor composites, a solar cell can also be integrated with infused transparent epoxy on top of these composites. This could help to manufacture a triple function device that could:

(a) harvest energy from the sun, using the solar cell, (b) store energy in the electrochemically active regions of the composite, and (c) work as the lightweight structural component, which provides high tensile, bending, and impact strength.

To accomplish this goal, a commercial flexible solar cell and a development kit were purchased from PowerFilm. The customized development kit consists of two silicon-based flexible solar cells, 2.1 V, 50 mA (@1 sun) and an IoT device. Based on the sensors, the Bluetooth device can connect to an Android application and transmit information directly to a smartphone. It can transmit information such as:
(1) amount of charge left in supercapacitors
(2) surface temperature
(3) light intensity being received
(4) available cycle life of supercapacitors before replacement A 4-volt solar cell-supercapacitor integrated e-CFRP composite device (which is 2 solid-state devices in series) was fabricated (FIG. 13G). This was used to power the IoT device with the help of a charge controller (built-in). The connection circuit is shown in FIG. 13H. The two solar cells connected in parallel helped to charge the supercapacitors up to 4 V within approximately 80 s (FIG. 13I). Beyond this, the solar light was cut OFF and the IoT device was turned ON. The android application running on a nearby smartphone (FIG. 13J) detected the integrated device and was able to display the above-listed information in real-time for the next 70 s until the voltage dropped below 1.5 V.

The charge controller employs the BQ25570 Ultra-Low Power Management IC (Texas Instruments) with integrated maximum power point tracking (MPPT) and boost/buck energy management circuitry. This component enhances the energy collection, storage, and distribution capabilities of the integrated device, as the MPPT allows for the maximum power to be extracted from the solar panel. The voltage step-up function of the boost converter facilitates charging the supercapacitor to a higher voltage (3-4 V) than that provided by the solar panel, which is useful when collecting energy from low power/low voltage sources. The controller was configured to safely charge the supercapacitors to a nominal voltage of 4.2 V while automatically preventing overcharging and undercharging by internally disconnecting the source (solar panel) or electrical load whenever necessary. Data from the onboard sensors were transmitted in real-time via Bluetooth to a connected Android device and viewed through the PFDEV-TI Data Monitoring application.

This type of application could be very useful in CubeSats used by NASA or other space agencies. Since NASA already uses regular carbon fiber composites, the outer body of the CubeSats could be made of these integrated composite devices, which not only forms the body of the satellite but also could harvest and store energy while facing the sun and use that energy to run the internal IoT based electronics when it goes to the other (dark) side.

Comparison with Other Structural Energy Storage Composites

Though there are a few conceptual reports of the structural energy storage composite are presently available, a real structural composite which combines high storage capacity and mechanical properties (mechanical properties comparable to a commercial carbon composite) is still missing. An early attempt to make such a composite was performed by US Army Research Laboratory, where a carbon fiber lamina was used as anode and a metal mesh coated with cathode material as positive electrode. Though the composite was able to show some mechanical strength, the energy storage ability was very low. In recent years, a few studies have also been published in this direction. However, there are many limitations in using these as body shells of EVs which are rectified in our energized composites A comparison of the performance these composites with the energized composite disclosed herein is given in the following Table.

TABLE 1

| Ref. | Similar Composites (electrode config. & electrolyte) | Performance Pitfail | Superiority of Disclosed Energized Composite |
|---|---|---|---|
| [1] | Carbon electrode coatings on the rigid honeycomb Al current collector walls. 1M TEABF$_4$ in propylene carbonate (PC) electrolyte | Use of flammable organic electrolyte Only designed for bending loads. No tension or impact test. | Used non-flammable aqueous electrolyte Designed to take tension, bending and impact loads. |
| [2] | Activated carbon casted on aluminum foils sandwiched with epoxy-carbon fiber mats. PVDF, lithium triflate-epoxy binder | Use of Al foil in the stacking assembly -lower tensile strength (only 80 MPa). No unique electrode structure-low energy density of 2.64 Wh kg$^{-1}$, low 5000 cycle life (CL) | All fiber composite-tensile test shows a superior strength of 540 MPa. VGCF/metal oxide (MO) nano structure, energy density of 41.4 Wh kg$^{-1}$. high 8500 CL |
| [3] | Discontinuous carbon fiber (CF) dry prepegs electrodes PVDF, lithium triflate and epoxy | Areal capacitance of only 0.128 mF cm$^{-2}$. Low flexural strength of 47.49 MPa, no tension or impact test performed. | Areal capacitance of 559 mF cm$^{-2}$. Flexural strength of 477.75 MPa. Tension & impact test performed |
| [4] | Nanoporous silicon interfaces electrodes. Bisphenol A ionic liquid-epoxy resin as electrolyte | Tensile strength of only 1 MPa Expensive ionic liquid (IL) electrolyte energy density of 5-8 Wh kg$^{-1}$ and a low 4000 CL | Tensile strength of 518 MPa Cheap aqueous electrolyte Energy density of 41.4 Wh kg$^{-1}$. High 8500 CL |
| [5] | Activated carbon fiber mat as electrodes. Ethylene carbonate (EC), propylene carbonate (PC) and LiTFSI as electrolyte | No unique electrode structure -specific capacitance of 52 mF g$^{-1}$. Use of flammable organic electrolyte. No tension, impact or bending test performed. | VGCF/MO nano-structures -specific capacitance of 74.5 Fg$^{-1}$. Aqueous electrolyte Data for tension, bending and impact test are provided. |

TABLE 1-continued

| Ref. | Similar Composites (electrode config. & electrolyte) | Performance Pitfail | Superiority of Disclosed Energized Composite |
| --- | --- | --- | --- |
| [6] | Carbon nano tube, polyaniline decorated CF electrodes. Poly ethylene glycol-solid polymer electrolyte | Low energy density of 17.4 mWh kg$^{-1}$. Flexural strength of only 21.32 MPa, no tension or impact test | High energy density of 41.4 Wh kg$^{-1}$. Flexural strength of 477.75 MPa. Impact and tension test done |
| [7] | Lithium iron phosphate on Al foil (+ve) and CF on Cu foil (−ve) EC and PC organic solvent with LiTf | Flammable organic electrolyte Lower tensile strength of 312 MPa and no data for bending and impact test. | Non-flammable aqueous electrolyte. High tensile strength of 518 MPa and data for bending and impact test also available. |

Ref:
[1] R. Reece, C. Lekakou, P. A. Smith, Acs Appl Mater Inter 2020, 12, 25683.
[2] Y. Wang, X. Qiao, C. Zhang, X. Zhou, Journal of Energy Storage 2019. 26, 100968.
[3] Y. Xu, S. Pei, Y. Yan, L. Wang, G. Xu, S. Yarlagadda, T.-W. Chou, Acs Appl Mater Inter 2021. 13. 11774.
[4] A. S. Westover, B. Baer, B. H. Bello, H. Sun, L. Oakes, L. M. Bellan, C. L. Pint, Journal of Materials Chemistry A 2015, 3, 20097.
[5] N. Shirshova, H. Qian, M. S. Shaffer, J. H. Steinke, E. S. Greenhalgh, P. T. Curtis, A. Kucernak, A. Bismarck, Composites Part A: Applied Science and Manufacturing 2013, 46, 96.
[6] N. S. Hudak. A. D. Schlichting, K. Eisenbeiser, J Electrochem Soc 2017, 164, A691.
[7] L. E. Asp, K. Bouton, D. Carlstedt, S. Duan, R. Harnden, W. Johannisson, M. Johansen, M. K. Johansson, G. Lindbergh, F. Liu, Advanced Energy and Sustainability Research 2021, 2, 2000093.

Conclusion

As disclosed herein, a dual-function energized composite material and system were created that can be employed, for example, as a EV's body shell storing and distributing electrical energy while providing mechanical properties equivalent to existing body shell materials. This additional energy can be used to run/accelerate the vehicle and provide extra miles per charge. This was made possible by using a unique vertically attached graphene on carbon fiber structure electrodes (enhancing its surface area) upon which metal oxides were deposited that significantly enhanced the energy density of these electrodes. These electrodes were first optimized and tested in 1 M Na$_2$SO$_4$ electrolyte solution, and then a 1 M Na$_2$SO$_4$—Polyacrylamide aqueous gel electrolyte was synthesized for the development of a solid-state device. A multilayer assembly was developed using a special alternate layer patterning approach with epoxy, gel electrolyte and electrode material on carbon fiber mats.

Relevant electrochemical characterizations and mechanical tests based on the industry applicable ASTM standards were performed on these energized composites. Having an excellent areal energy density, the composites were molded into the shape of a toy car's floor panel and was used to operate the toy car using the energy stored in it. This composite was also integrated with a commercial flexible solar cell to form a triple function (energy harvesting, energy-storing, and high mechanical strength) composite device. The composite was used to power an IoT device demonstrating its potential application in communication satellites as an energy storage device.

In addition to the automotive and space sectors, potential applications of these energized composites include, but are not limited to, use in commercial aerospace, as energized composites can be used in the form of the skin of unmanned aerial vehicles (UAVs), which are typically employed in carrying out surveillance operations. Replacing the heavy conventional power sources with lightweight energized composites will significantly lower UAVs' overall weight and provide additional flight time for surveillance. These energized composites constructed as the UAV's skin can be connected to solar cells, which will help in recharging the storage device while in flight, thereby not relying on refueling or recharging it on the ground. Additionally, the application of this energized composite could be extended to numerous vehicle technologies like commercial jets, military tanks, body armor for vehicles, and super soldiers.

Calculations of B Value and K Values

The b value is estimated using the Cottrell's equation.

$$i = av^b \tag{1}$$

Where i is the current in mA, v is the scan rate in mV s$^{-1}$, a and b are adjustable parameters. This is a generalized equation and can be applied to both battery and capacitive type charge storage. The current response for capacitive type storage follows a linear relationship with the scan rate, which is given by equation (2).

$$i = vC_d A \tag{2}$$

Where $C_d$ is the capacitance and A is the surface area. Comparing the two equations (1) and (2), for an ideal capacitive (which could be both double layer and faradaic) charge storage, the b parameter approaches to the value of 1. For a battery-type storage, the ion intercalation is kinetically limited by a solid-state diffusion process. This makes the current to be proportional to the square root of the scan rate for any given voltage reading. The detailed relationship can be given by equation (3).

$$i = nFAC.D^{1/2}v^{1/2}\left(\frac{\alpha n_a F}{RT}\right)^{1/2} \pi^{1/2} \chi^{(bt)} \tag{3}$$

Comparing equations (1) and (3), for a battery type solid-state ion diffusion charge storage, the b parameter approaches the value of ½, for a given voltage reading. Thus, determining the value of b at different voltages in the operational range of the device could help us to distinguish the capacitive charge storage from battery type charge storage. So, in order to do that log was taken on both sides of equation (1) and a curve was plotted as log i and log v, for all the CV curves (shown in FIG. 8A) between 0-2 V range at each voltage step of 0.1 V.

$$\log i = b.\log v + \log a \tag{4}$$

All these curves are shown in FIG. 9A. From the above equation 4, the slope of these curves would give the b value at that specific voltage V.

In order to determine k values following two equations were used.

$$i(V) = k_1 v + k_2 v^{1/2} \quad (5)$$

$$\frac{i(V)}{v^{1/2}} = k_1 v^{1/2} + k_2 \quad (6)$$

In the above equations, $K_1 v$ represents the capacitive contribution of the current, while $k_2 v^{1/2}$ makes up for the solid-state ion diffusion contribution. Eventually, the values of $k_1$ and $k_2$ were needed to get the individual contribution. Similar to the calculation of b value, curves were plotted between $$\frac{i(V)}{v^{1/2}}$$

and $v^{1/2}$ as shown in FIG. 9B at specific voltage steps of 0.1 V between the voltage range of 0 to 2 V. The slope of these curves gave the value of $k_1$ and intercepts made on y-axis gave the value of $k_2$.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains.

In this regard with respect to the electrode material, although the disclosure utilizes metal oxides like $Mn_3O_4$, $MnO_2$, $MoO_2$, $MoO_3$ in the exemplary embodiments, the disclosure contemplates the use of other suitable electrode materials that have applications as supercapacitor electrode materials. Non-limiting types include those used in EDLCs, pseudocapacitors, and asymmetric supercapacitors. Further, the disclosed composite can show battery type storage if battery materials are used for the electrode material.

With respect to the electrolyte materials, although the disclosure utilizes a particular polymer gel type electrolyte, the disclosed composite could also use other polymer gel type electrolytes as well as suitable electrolytes such as solid state and structural electrolytes.

Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended representative claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the representative claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following representative claims be interpreted to embrace all such variations and modifications.

What is claimed is:

1. A method of making an energy storing carbon fiber reinforced polymer composite, the method comprising:
depositing cathode material patches at spaced locations on a first cross-weaved carbon fiber mat to form a first cathode, the deposited cathode material patches collectively having a first configuration;
depositing anode material patches at spaced locations on a second cross-weaved carbon fiber mat to form a first anode, the deposited anode material patches collectively having a second configuration that matches the first configuration; and
stacking the first and second cross-weaved carbon fiber mats so that the cathode material patches substantially align with the anode material patches with a first separator cross-weaved glass fiber mat positioned between the first and second cross-weaved carbon fiber mats,
wherein the first separator cross-weaved glass fiber mat includes electrolyte coating patches on both sides, the electrolyte coating patches having a third configuration that matches the first and second configurations; and
wherein the spaces between the cathode material patches, the anode material patches, and the electrolyte coating patches include a filler material.

2. The method of claim 1 further comprising:
depositing cathode material patches at spaced locations on a third cross-weaved carbon fiber mat to form a second cathode, the deposited cathode material patches collectively having a fourth configuration;
depositing anode material patches at spaced locations on a fourth cross-weaved carbon fiber mat to form a second anode, the deposited anode material patches collectively having a fifth configuration that matches the fourth configuration;
stacking the third and fourth cross-weaved carbon fiber mats so that the cathode material patches substantially align with the anode material patches with a second separator cross-weaved glass fiber mat positioned between the third and fourth cross-weaved carbon fiber mats;

stacking the stacked third and fourth cross-weaved carbon fiber mats and second separator cross-weaved glass fiber mat and the stacked first and second cross-weaved carbon fiber mats and first separator cross-weaved glass fiber mat with a first insulator cross-weaved glass fiber mat positioned between the second and third cross-weaved carbon fiber mats; and electrically connecting the first and fourth cross-weaved carbon fiber mats in series, wherein the second separator cross-weaved glass fiber mat includes electrolyte coating patches on both sides, the electrolyte coating patches having a sixth configuration that matches the fourth and fifth configurations; and wherein the spaces between the cathode material patches, the anode material patches, and the electrolyte coating patches include a filler material.

3. The method of claim 2, wherein the filler material comprises an epoxy resin.

4. The method of claim 3, wherein the electrolyte coating patches comprise a PAM gel electrolyte.

5. The method of claim 2, wherein the electrolyte coating patches comprise a PAM gel electrolyte.

6. The method of claim 1, wherein the filler material comprises an epoxy resin.

7. The method of claim 6, wherein the electrolyte coating patches comprise a PAM gel electrolyte.

8. An energy storing carbon fiber reinforced polymer composite comprising:
a first cathode including cathode material patches at spaced locations on a first cross-weaved carbon fiber mat, the deposited cathode material patches collectively having a first configuration;
a first anode including anode material patches at spaced locations on a second cross-weaved carbon fiber mat, the deposited anode material patches collectively having a second configuration that matches the first configuration; and
a first separator cross-weaved glass fiber mat positioned between the first and second cross-weaved carbon fiber mats,
wherein the first and second cross-weaved carbon fiber mats are stacked so that the cathode material patches substantially align with the anode material patches;
wherein the first separator cross-weaved glass fiber mat includes electrolyte coating patches on both sides, the electrolyte coating patches having a third configuration that matches the first and second configurations; and
wherein the spaces between the cathode material patches, the anode material patches, and the electrolyte coating patches include a filler material.

9. The composite of claim 8 further comprising:
a second cathode including cathode material patches at spaced locations on a third cross-weaved carbon fiber mat, the deposited cathode material patches collectively having a fourth configuration;
a second anode including anode material patches at spaced locations on a fourth cross-weaved carbon fiber mat, the deposited anode material patches collectively having a fifth configuration that matches the fourth configuration; and
a second separator cross-weaved glass fiber mat positioned between the third and fourth cross-weaved carbon fiber mats,
wherein the third and fourth cross-weaved carbon fiber mats are stacked so that the cathode material patches substantially align with the anode material patches;
wherein the stacked third and fourth cross-weaved carbon fiber mats and second separator cross-weaved glass fiber mat and the stacked first and second cross-weaved carbon fiber mats and first separator cross-weaved glass fiber mat are stacked with a first insulator cross-weaved glass fiber mat positioned between the second and third cross-weaved carbon fiber mats;
wherein the first and fourth cross-weaved carbon fiber mats are electrically connected in series;
wherein the second separator cross-weaved glass fiber mat includes electrolyte coating patches on both sides, the electrolyte coating patches having a sixth configuration that matches the fourth and fifth configurations; and
wherein the spaces between the cathode material patches, the anode material patches, and the electrolyte coating patches include a filler material.

10. The composite of claim 9, wherein the filler material comprises an epoxy resin.

11. The composite of claim 10, wherein the electrolyte coating patches comprise a PAM gel electrolyte.

12. The composite of claim 9, wherein the electrolyte coating patches comprise a PAM gel electrolyte.

13. The composite of claim 8, wherein the filler material comprises an epoxy resin.

14. The composite of claim 13, wherein the electrolyte coating patches comprise a PAM gel electrolyte.

15. An energy storing device panel for a device comprising the carbon fiber reinforced polymer composite of claim 8.

16. The energy storing device panel of claim 15, wherein the device is an electric vehicle.

* * * * *